United States Patent
Li et al.

(10) Patent No.: US 8,937,942 B1
(45) Date of Patent: Jan. 20, 2015

(54) STORING SESSION INFORMATION IN NETWORK DEVICES

(75) Inventors: Xianzhi Li, Santa Clara, CA (US);
Qingming Ma, Santa Clara, CA (US);
Jianhua Gu, Pleasanton, CA (US);
Sanjay Gupta, Santa Clara, CA (US);
Zeyong Lin, San Ramon, CA (US);
Dongsheng Mu, San Ramon, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 954 days.

(21) Appl. No.: 12/828,477

(22) Filed: Jul. 1, 2010

Related U.S. Application Data

(60) Provisional application No. 61/329,462, filed on Apr. 29, 2010.

(51) Int. Cl.
*H04L 12/50* (2006.01)
*H04Q 11/00* (2006.01)
*G06F 15/16* (2006.01)
*G06F 9/34* (2006.01)

(52) U.S. Cl.
USPC ........ 370/386; 370/392; 370/395.7; 709/208; 709/227; 709/238; 710/301; 711/216; 712/31

(58) Field of Classification Search
USPC ............... 370/386, 392, 395.7; 709/208, 227, 709/238; 710/301; 711/216; 712/31
See application file for complete search history.

(56) References Cited

U.S. PATENT DOCUMENTS

| | | | | |
|---|---|---|---|---|
| 6,252,878 | B1 * | 6/2001 | Locklear et al. | 370/401 |
| 6,826,613 | B1 * | 11/2004 | Wang et al. | 709/227 |
| 6,954,463 | B1 * | 10/2005 | Ma et al. | 370/401 |
| 6,971,044 | B2 * | 11/2005 | Geng et al. | 714/11 |
| 6,999,454 | B1 * | 2/2006 | Crump | 370/389 |
| 7,222,150 | B1 * | 5/2007 | Phillips et al. | 709/202 |
| 7,277,991 | B2 * | 10/2007 | Day et al. | 711/137 |
| 7,298,755 | B2 * | 11/2007 | Walls et al. | 370/414 |
| 7,305,581 | B2 * | 12/2007 | Geng et al. | 714/11 |
| 7,310,314 | B1 * | 12/2007 | Katz et al. | 370/238 |
| 7,440,457 | B2 * | 10/2008 | Okuno | 370/392 |
| 7,447,220 | B2 * | 11/2008 | Lu et al. | 370/401 |
| 7,518,986 | B1 * | 4/2009 | Chadalavada et al. | 370/218 |
| 7,552,262 | B1 * | 6/2009 | Turner et al. | 710/302 |

(Continued)

OTHER PUBLICATIONS

U.S. Appl. No. 12/754,377, by Wing Leong Poon, filed Apr. 5, 2010.

(Continued)

*Primary Examiner* — Alpus H Hsu

(74) *Attorney, Agent, or Firm* — Shumaker & Sieffert, P.A.

(57) ABSTRACT

In one example, a network device includes a network interface that receives a packet, a storage card that stores session data for monitored network sessions, a plurality of service processing cards that process packets of respective subsets of the network sessions, wherein each of the service processing cards comprises a respective memory to store session data for the respective subset of the network sessions processed by the corresponding service processing card, and a switch fabric coupled to the network interface, the storage card, and the plurality of service processing cards. One or more of the plurality of service cards process the received packet based on the session data stored by the storage card. The one or more of the plurality of service cards retrieve the session data for the network session to which the packet corresponds from the storage card and store the retrieved session data in the respective memory.

26 Claims, 8 Drawing Sheets

(56) References Cited

U.S. PATENT DOCUMENTS

| | | | |
|---|---|---|---|
| 7,554,909 B2 * | 6/2009 | Raghunath et al. | 370/230 |
| 7,577,753 B2 * | 8/2009 | Temoshenko et al. | 709/237 |
| 7,606,245 B2 * | 10/2009 | Ma et al. | 370/401 |
| 7,606,867 B1 * | 10/2009 | Singhal et al. | 709/209 |
| 7,657,537 B1 * | 2/2010 | Corbett | 718/101 |
| 7,720,061 B1 * | 5/2010 | Krishnaswamy et al. | 370/389 |
| 7,948,986 B1 * | 5/2011 | Ghosh et al. | 370/392 |
| 8,014,295 B2 * | 9/2011 | Chang et al. | 370/241 |
| 8,050,559 B2 * | 11/2011 | Sindhu | 398/49 |
| 8,189,579 B1 * | 5/2012 | Krishnaswamy et al. | 370/389 |
| 2002/0080789 A1 * | 6/2002 | Henderson et al. | 370/392 |
| 2002/0103921 A1 * | 8/2002 | Nair et al. | 709/232 |
| 2003/0200330 A1 * | 10/2003 | Oelke et al. | 709/238 |
| 2006/0140185 A1 * | 6/2006 | Norman et al. | 370/389 |
| 2007/0280256 A1 * | 12/2007 | Forslow | 370/395.2 |
| 2008/0034120 A1 * | 2/2008 | Oyadomari et al. | 709/248 |
| 2008/0044181 A1 | 2/2008 | Sindhu | |
| 2008/0089327 A1 * | 4/2008 | Lu et al. | 370/389 |
| 2009/0080428 A1 * | 3/2009 | Witkowski et al. | 370/392 |

OTHER PUBLICATIONS

U.S. Appl. No. 12/759,850, by Pradeep Sindhu, filed Apr. 14, 2010.

* cited by examiner

STORING SESSION INFORMATION IN NETWORK DEVICES

This application claims the benefit of U.S. Provisional Application No. 61/329,462, filed Apr. 29, 2010, which is hereby incorporated by reference in its entirety.

TECHNICAL FIELD

This disclosure relates to computer networks, and more particularly, to storing network session information within computer networks.

BACKGROUND

A computer network is a collection of interconnected computing devices that can exchange data and share resources. In a packet-based network, the computing devices communicate data by dividing the data into small blocks called packets, which are individually routed across the network from a source device to a destination device. The destination device extracts the data from the packets and assembles the data into its original form. Dividing the data into packets enables the source device to resend only those individual packets that may be lost during transmission.

Network devices exchange packets in packet flows during network sessions. Typically, one network device establishes a network session, also referred to as a communication session, with another network device. Each of the two network devices transmits packets of the network session in a respective packet flow to the other network device. In general, a network session corresponds to two packet flows, one packet flow in either direction between the two network devices participating in the network session. In some examples, a network session corresponds to multiple packet flows, with one or more packet flows in either direction between network devices participating in the network session.

In some cases, intermediate devices store packet flow state information and/or network session state information, e.g., when monitoring the packet flows and/or network sessions. For example, many network security devices such as intrusion detection and prevention devices (IDP devices) and firewall devices, monitor packet flow state information to determine whether a network device participating in a communication session is exhibiting signs of malicious behavior. As another example, application acceleration systems monitor packet flow state information to add a new packet flow, close an existing packet flow, or decide to which flow a received packet belongs. Common Internet File System (CIFS) acceleration, as another example, accesses session state information to determine whether a file block has been cached locally.

Many devices, such as cellular telephones and other mobile devices, are becoming Internet-capable, and more consumers are connecting to the Internet on a regular basis. Accordingly, the burden on intermediate network devices that monitor packet flow state information is increasing. Some intermediate network devices, for example, are tasked with monitoring tens of million packet flows. One example data structure for storing flow state information for one packet flow occupies hundreds of bytes or even multiple kilobytes. Intermediate devices commonly store such data structures as entries in a flow table, where there are entries for each monitored packet flow. Thus to successfully monitor all of the packet flows, an intermediate device uses a tremendous amount of memory, which in turn diverts processing resources to performing memory management.

SUMMARY

In general, this disclosure describes techniques for managing memory in a manner that reduces demand for memory when monitoring packet flow state information and, likewise, network session state information. In particular, the techniques of this disclosure are directed to providing a distributed storage system that stores packet flow state information for a plurality of service processing cards (SPCs) of an intermediate network device. The distributed storage system includes a storage card for storing network session state information for packet flows of network session both previously processed and currently being processed by the SPCs. The distributed storage system also includes a cache within each of the SPCs that stores packet flow information for those packet flows currently being processed by the respective SPCs. In some instances, the storage card couples directly to a switch fabric to which the SPCs also directly couple to facilitate efficient access to the storage card by the SPCs.

In one example, a network device includes a network interface that receives a packet, a storage card that stores session data for network sessions monitored by the network device, a plurality of service processing cards that each processes packets of a respective subset of the network sessions, wherein each of the service processing cards comprises a respective memory to store session data for the respective subset of the network sessions processed by the corresponding service processing card, and a switch fabric coupled to the network interface, the storage card, and the plurality of service processing cards, such that the switch fabric interconnects the network interface, the storage card and the plurality of service processing cards with one another. One or more of the plurality of service cards process the received packet based on the session data stored by the storage card. To process the packet, the one or more of the plurality of service cards retrieve the session data for the network session to which the packet corresponds from the storage card and store the retrieved session data in the respective memory In another example, a method includes receiving, with a network device, a packet via a network interface, processing the received packet with one of a plurality of service processing cards of the network device that each processes packets of a respective subset of network sessions, wherein each of the service processing cards comprises a respective memory to store session data for the respective subset of the network sessions processed by the corresponding service processing card, and wherein processing the received packet comprises retrieving session data for the network session to which the packet corresponds from a storage card that stores session data for network sessions monitored by the network device via a switch fabric coupled to the network interface, the storage card, and the plurality of service processing cards, wherein the switch fabric interconnects the network interface, the storage card and the plurality of service processing cards with one another, storing the retrieved session data in the memory of the one of the plurality of service processing cards, and processing the received packet based on the session data stored by the storage card, and outputting the processed packet.

In another example, a computer-readable storage medium comprises instructions that, when executed, cause a processor of a network device to receive a packet, process the received packet with one of a plurality of service processing cards of the network device that each processes packets of a respective subset of network sessions, wherein each of the service processing cards comprises a respective memory to store session data for the respective subset of the network sessions processed by the corresponding service processing card, and wherein the instructions to process the received packet comprise instructions to retrieve session data for the network session to which the packet corresponds from a storage card of the network device that stores session data for network sessions monitored by the network device via a switch fabric coupled to the network interface, the storage card, and the plurality of service processing cards, wherein the switch fabric interconnects the network interface, the storage card and the plurality of service processing cards with one another, store the retrieved session data in the memory of the one of the plurality of service processing cards, and process the received packet based on the session data stored by the storage card, and output the processed packet.

The details of one or more examples are set forth in the accompanying drawings and the description below. Other features, objects, and advantages will be apparent from the description and drawings, and from the claims.

DETAILED DESCRIPTION

Figure 1:
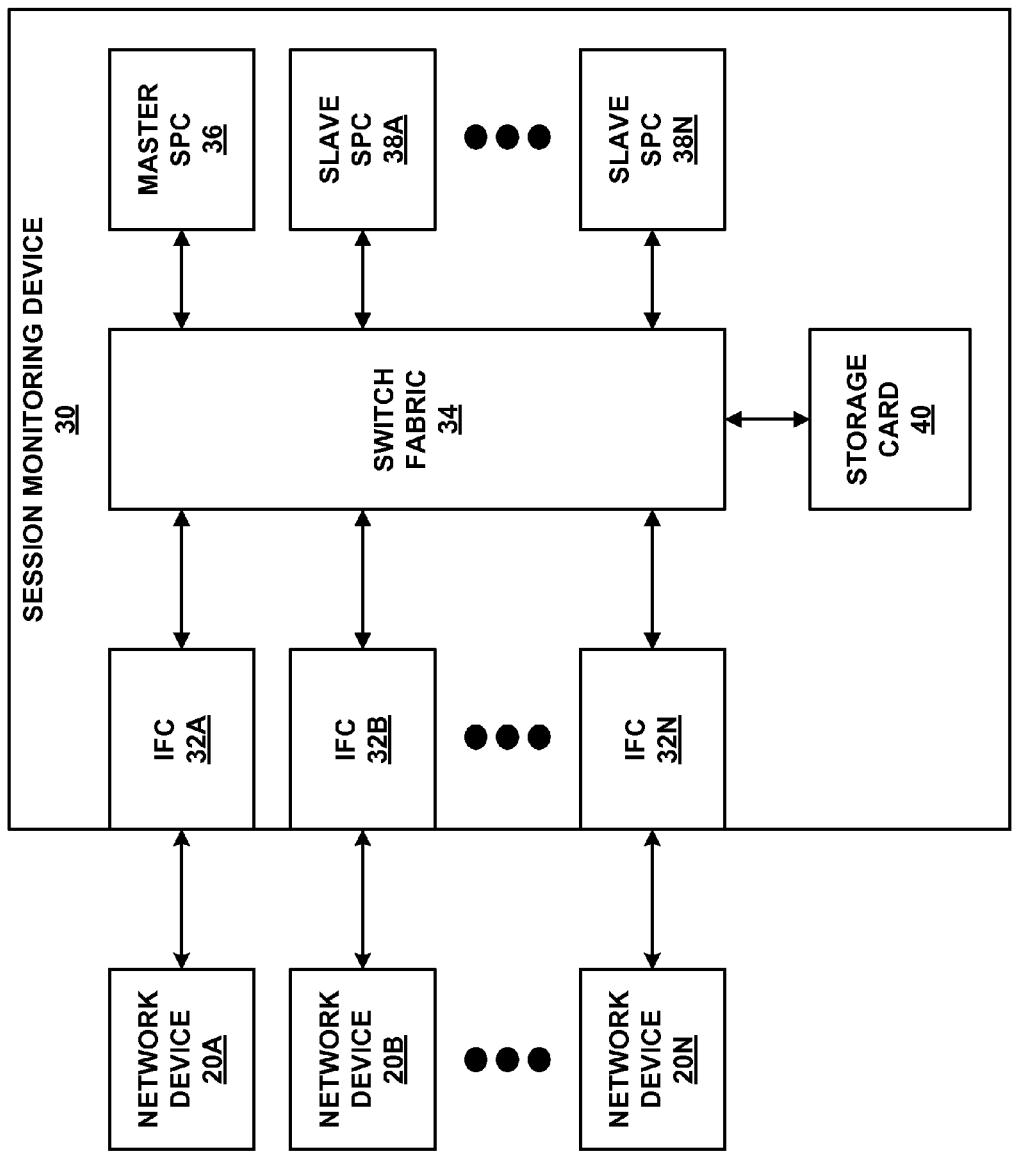
FIG. 1 is a block diagram illustrating an example system including a number of network devices and a session monitoring device.

In general, this disclosure describes techniques for managing memory demands for monitoring packet flow state information and network session state information. These techniques are directed to providing a distributed storage system that stores packet flow state information for a number of service processing cards (SPCs) of an intermediate network device. In general, each of the SPCs processes packet flows of a subset of network sessions monitored by the network device. In one example, one of the plurality of service processing cards corresponds to a master SPC, while the remaining cards are slave SPCs. The master SPC allocates network sessions among the slave SPCs for processing, based on load balancing techniques. The techniques of this disclosure, for purposes of example, are described with respect to network sessions corresponding to two packet flows, one packet flow in either direction, between two network devices participating in the network session.

The distributed storage system provided by the techniques of this disclosure includes a storage card that stores session state information for each of the network sessions monitored by the network device, coupled to the SPCs via a switch fabric. Thus each of the SPCs cache recently used session state information locally for the subset of network sessions processed by the SPC, while the storage card stores session state information for all of the network sessions, whether currently being processed or previously processed by the SPCs. That is, the SPC stores recent session state data in the corresponding cache, while exporting less recently used data from the cache to the storage device.

The session state information is divided into two parts: session state header information and session state body information. The session state header information includes session identification information, e.g., the session-identifying five-tuple. The session state body information includes the actual session state used for processing the network session. The master SPC stores data that indicates which SPC is processing each of the network sessions, which may include the session state header information but not the session state body information, in accordance with a data structure, such as a hashed-link list. Using this data, the master SPC is able to determine which network session is being processed by which SPC, and can perform a form of load balancing between the SPCs when assigning a new network session to one of the SPCs. When a packet from a new network session is received, the master SPC assigns the network session to one of the slave SPCs so as to balance the overall load associated with processing network sessions across all of the slave SPCs, e.g., based on the number of network sessions being processed by each of the slave SPCs. To process received packets associated with existing network sessions, the interface cards may directly forward the packet to the one of the SPCs that was previously assigned the network session to which the received packet corresponds.

Rather than using additional local memory in the form of caches of increased size within each of the SPCs to accommodate the processing of an ever increasing number of network sessions, the SPCs store less recently used network session information to the storage card for use at a later time, should additional packets be received that correspond to this network session. In the event such packets are received, the SPCs can retrieve this session information from the storage card and proceed with processing these packets. In some instances, the storage card couples directly to a switch fabric to which the SPCs also directly couple to facilitate efficient access to the storage card by the SPCs.

Consequently, the techniques of this disclosure may lessen demand for increasing amounts of local memory within SPCs by providing a hierarchically distributed storage system having a scalable storage card for storing large amounts of both recent and not-so-recent network session and packet flow state information. By providing this hierarchically distributed storage system having a first level cache included within each SPC and a second-level storage card accessible by each SPC, the techniques may facilitate scalability in the sense that increasing an amount of storage in a storage card generally impacts costs in terms of expense compared to upgrading each of the SPCs to include additional cache memory or replacing each of the SPCs with new SPCs having additional cache memory. Rather than upgrade or replace these SPCs, the techniques provide a storage card that can more easily be replaced with a new storage card providing considerably more storage capacity.

FIG. 1 is a block diagram illustrating an example system 2 that stores session information in accordance with the techniques of this disclosure. In the example of FIG. 1, system 2 includes network devices 20A-20N (network devices 20) and session monitoring device 30. In general, network devices 20 establish network sessions with each other, where each network session includes packet flows that pass through session monitoring device 30. A network session generally includes a first unidirectional packet flow from one of network devices 20 (a so-called "source device") to another one of network devices 20 (a so-called destination device) and a second unidirectional packet flow from the destination device to the source device. Network devices 20 are shown in the example of FIG. 1 to be coupled directly to session monitoring device 30 for purposes of illustration, but instead may, in some instances, be directly coupled to an intermediate device positioned between network devices 20 and session monitoring device 30, which then may be coupled to session monitoring device 30. The intermediate device may comprise a router, switch, network hub, network bridge, gateway, security device, or any other such network device. Moreover, one or more intermediate network devices may be positioned between network devices 20 and session monitoring device 30 and the techniques should not be limited in this respect to the direct coupling shown in the example of FIG. 1.

In general, session monitoring device 30 represents a network device that monitors network sessions between network devices 20, which may each represent one or more of a server, a print server, a workstation, a cellular phone (including so-called "smart phones"), a personal digital assistant (PDA), a so-called "netbook," a personal computer, a laptop, a desktop, a set-top box (STB), or any other device capable of initiating or accepting network sessions. Session monitoring device 30 generally monitors network sessions by inspecting packets or other discrete data units associated with any given network session. In some instances, session monitoring device 30 may monitor network sessions transparently such that network devices 20 are unaware of the monitoring performed by session monitoring device 30. In this sense, session monitoring device 30 may be passive and only monitor packets associated with network sessions. In other instances, session monitoring device 30 may actively monitor network sessions as well as perform operations, such as dropping a packet, based on the inspection of the packets.

As shown in the example of FIG. 1, session monitoring device 30 includes at least one interface in the form of interface cards 32A-32N, a switch fabric 34, a master service processing card 36 ("master SPC 36"), one or more slave service processing cards 38A-38N ("slave SPCs 38") and a storage card 40. Although the same letter 'N' designates the cardinality of network devices 20, IFCs 32, and slave SPCs 38, it should be understood that the letter 'N' is variable in each instance and is not intended to indicate that the number of network devices, IFCs, or slave SPCs is equal or implied by the letter 'N'. On the contrary, there may be different numbers of network devices 20, IFCs 32, and slave SPCs 38. Multiple network devices 20 may connect to a single one of IFCs 32, e.g., when network devices 20 connect to an intermediate device, such as a router or switch, that directs packet flows from a number of network devices to a single common output.

Each of IFCs 32 represents one or more interfaces that receive and output packets associated with packet flows corresponding to various network sessions. IFCs 32 may represent hardware or physical interfaces or a combination of hardware or physical interfaces and logical or virtual interfaces. For purposes of illustration, IFCs 32 are each shown in the example of FIG. 1 coupled to a different one of networks devices 20, but the techniques should not be limited in this respect and may be implemented with respect to IFCs 32 that couple to more than one network device 20.

Switch fabric 34 represents a communicative medium capable of interconnecting any number of modules, units or other components internal or, in some instances, external from session monitoring device 30. In the example of FIG. 1, switch fabric 34 interconnects IFCs 32, master SPC 36, slave SPCs 38, and storage card 40. Switch fabric 34 may concurrently interconnect any two or more different ones of IFCs 32, master SPC 36, slave SPCs 38, and storage card 40. Using switch fabric 34, each of IFCs 32, master SPC 36, slave SPCs 38, and storage card 40 can communicate and transfer data with any other one of IFCs 32, master SPC 36, slave SPCs 38 and storage card 40. The use of switch fabrics to interconnect various elements has been described in published U.S. patent application, entitled "Multi-Chassis Router with Multiplexed Optical Interconnects," with inventor Pradeep Sindhu, identified by U.S. patent application Ser. No. 11/832,342, and filed Aug. 1, 2007, the entire contents of which are incorporated by reference as if fully set forth in its entirety herein. While described with respect to a switch fabric, the techniques may be implemented with respect to a session monitoring device 30 that includes any form of interconnection capable of supporting one or more interconnections between IFCs 32, master SPC 36, slave SPCs 38 and storage card 40.

Switch fabric 34 may forward or otherwise switch packets between any pair-wise combination of IFCs 32, master SPC 36 and slave SPCs 38. Moreover, switch fabric 34, as described in more detail below, may switch access requests and responses between any pair-wise combination of master SPC 36, slave SPCs 38 and storage card 40. In this respect, switch fabric 34 may be utilized to switch both packets and access requests and responses, often concurrently. In this way, switch fabric 34 may be adapted to handle these access requests and responses in accordance with the techniques of this disclosure as described below in more detail.

In some instances, switch fabric 34 transmits packets in the form of one or more cells, where any given packet is divided into one or more discrete units referred to as cells. These cells are of fixed size to facilitate orderly and timely forwarding through switch fabric 34. IFCs 32 may be controlled by one or more packet forwarding engines (not shown in FIG. 1) that provides control logic, queues and other hardware and/or software to properly interface with switch fabric 34. This control logic, queues and other hardware is described in more detail with respect to U.S. patent application Ser. No. 12/754, 377, entitled "Cell Sharing to Improve Switch Fabric Throughput within a Network Device," by inventors Venkatraman Chandrasekaran et al., and filed Apr. 5, 2010, which is hereby incorporated by reference as if set forth in its entirety herein. Each of SPCs 36, 38 and storage card 40 may also include this control logic, queues and other hardware to properly interface with switch fabric 34. More information regarding general cell routing and switch fabric operation may be found in pending U.S. patent application entitled "Deadlock-Resistant Fabric Tree Replication in a Network Device," identified by U.S. patent application Ser. No. 12/759,850, with inventors Jean-Marc Frailong et al., and filed Apr. 14, 2010, which is hereby incorporated by reference as if set forth in its entirety herein.

In these cell-based switch fabric instances, the packet forwarding engine divides packets into one or more fixed-size cells and presents these cells. Each of these cells may include a header identifying a port of switch fabric 34 to which the particular cell is destined. Switch fabric 34 then independently routes these one or more cells to the identified destination port, where the receiving packet forwarding engine, master SPC 36, one of slave SPCs 38 or storage card 40 removes the headers from the cells and rearranges the cells to reform the packet. The control logic to interface with switch fabric 34 may further include a data access layer above this cellular transport layer to communicate the access requests generated by SPCs 36, 38 to storage card 40. This data access layer, as noted below, may include an implementation of an Internet small computer system interface (iSCSI). The iSCSI module, which is not shown in FIG. 1 for ease of illustration purposes, may receive these requests and present them to the control logic noted above as if these requests were packets. The control logic then identifies a destination port to which storage card 40 is coupled, divides the access request into one or more cells and transmits these cells, often concurrent to cells corresponding to actual packets, to storage card 40, which reforms the access request from the cells. Storage card 40 may likewise include an iSCSI module that also presents responses to these access requests as if they are packets to the above noted control logic, whereupon this control logic divides these responses into cells and independently forwards each of these cells to the destination specified in the header of each cell. In this way, switch fabric 34 may be adapted to switch cells corresponding to access requests and responses as if these were packets.

Master SPC 36 generally represents a general service processing card, which may be substantially similar to each of slave SPCs 38, except that master SPC 36 is configured as a master device rather than a slave device. Once configured as the master device, SPC 36 resides as master over slave SPCs 38 and is responsible for distributing the monitoring of active or current network sessions among SPCs 36, 38. Often, master SPC 36 performs a form of load balancing to balance the number of network sessions between SPCs 36, 38. To perform this load balancing, master SPC 36 generally acts as an aggregation and distribution unit for new network sessions.

To illustrate, IFCs 32 may receive packets from network devices 20. IFCs 32 may parse these packets to extract a five-tuple, i.e., a source Internet protocol (IP) address, a destination IP address, and a source port, a destination port, and a protocol. Using this parsed five-tuple, IFCs 32 perform a look-up in a flow table or other data structure to determine whether or not IFCs 32 have previously processed a packet flow corresponding with a previously established network session. If not, IFCs 32 determine that the network session is a potentially new network session and forwards those packets corresponding to potentially new network sessions to master SPC 36, which then assigns this packet as well as the potentially new network session to one of SPCs 36, 38 for service processing. In this respect, master SPC 36 aggregates all packets associated with potentially new network sessions and distributes these identified packets to one or more of SPCs 36, 38 in a manner that balances a load (e.g., as determined by a number of network sessions) across all of SPCs 36, 38. While load balancing is described in this example with respect to a number of network sessions, master SPC 36 may perform load balancing with respect to other measurements of load, including processor utilization, memory utilization, cache hit-to-miss ratio, or any other metric commonly used for evaluating loads so as to perform load balancing.

After assigning this packet to one of SPCs 36, 38, master SPC 36 forwards this packet to the assigned one of SPCs 36, 38, which proceeds to process the packet by applying one or more services, such as an intrusion detection and prevention (IDP) service, a wide area network (WAN) acceleration (X) service (which is sometimes referred to as a "WX service"), a secure socket layer (SSL) service, or any other service commonly applied to network packets. After processing the packet in accordance with one or more services, this one of SPCs 36, 38 then forwards the processed packet back the one of IFCs 36 that received the packet. This one of IFCs 36 then performs a look-up again using the parsed five-tuple to determine a nexthop, i.e., one of IFCs 36 coupled to a next link in a route from the source device identified by the source address and the destination device identified by the destination address. This one of IFCs 36 then forwards this packet to the nexthop, i.e., another one of IFCs 36, which proceeds to forward the packet to its destination. In this manner, session monitoring device 30 monitors network sessions to, in this instance, apply one or more services to packets corresponding to these monitored network sessions.

Throughout application of these services, SPCs 36, 38 stores session state information for network sessions between network devices 20. While not shown explicitly in the example of FIG. 1, SPCs 36, 38 each includes a cache or other memory that enables high-speed retrieval and storage of session state information. Commonly, each of SPCS 36, 38 stores session state information for thousands, if not tens of thousands of sessions, which requires that each of SPCs 36, 38 include substantial amounts of memory storage space in the form of high capacity memory. Although memory has decreased in price over time, high-capacity, high-speed memory is still costly.

Moreover, due to the rapid growth in the Internet and other public networks as well as the convergence of mobile data networks and voice networks with the Internet, the number of network sessions has the potential to increase exponentially in the next couple of years. This exponential growth may potentially require that each of SPCs 36, 38 process hundreds of thousands, if not millions, of network sessions, requiring a substantial increase in local cache memory. Given that SPCs 36, 38 are generally required to adhere to a card form factor to fit within standard network chassis, these SPCs 36, 38 provide only limited physical board space that may not accommodate increasing amounts of memory. As a result, SPCs 36, 38 may need to be replaced with newer SPCs 36, 38, which is expensive, considering that each session monitoring device owned by a service provider may require potentially 10-20 new SPCs.

In accordance with the techniques of this disclosure, session monitoring device 30 includes storage card 40 that may alleviate scalability issues that result due to memory constraints on SPCs 36, 38. Storage card 40 represents a physical card that provides a storage device, such as a hard drive for long term caching of session state information. As shown in the example of FIG. 1, storage card 40 is internal to session monitoring device 30 and couples directly to switch fabric 34. By coupling directly to switch fabric 34, storage card 40 can be quickly accessed by any one of SPCs 36, 38. As noted above, SPC 36, 38 each include a cache, where this collection of caches generally represents a first-level in a hierarchically-ordered distributed storage system. Storage card 40 generally represents a second-level in the hierarchically-ordered distributed storage system. Storage card 40 is the second-level in that it stores less often used session state information as well as more frequently used session state information. In this respect, storage card 40 represents a central long-term repository for session state information that SPCs 36, 38 may access to retrieve dormant session state information upon receiving a packet associated with a dormant network session.

As noted in more detail below, session monitoring device 30 may be configured in a manner that improves retrieval of session state information from storage card 40 so that accessing this second-level storage device does not introduce significant delay in the processing of packets by SPCs 36, 38. As a result of these improvements, session monitoring device 30 may utilize storage card 40 as a highly expandable central repository for storing session state information for current and dormant network sessions without encountering costly scaling issues. The techniques may avoid scaling issues because storage card 40 may feature a hard-drive or other extremely high capacity storage device that may be orders of magnitude greater than that of memories. Consequently, a single storage card may store session state information for tens of millions, if not more, sessions. Should network sessions continue in this exponential trajectory, upgrading session monitoring device 30 to accommodate these increased numbers of network sessions may be accomplished by upgrading storage card 40 with a new higher-capacity storage device, replacing storage card 40 with a newer storage card 40 having a higher-capacity storage device or adding another storage card 40. As storage devices generally cost substantially less than memory on a cost-per-byte basis, any one of these options of adding capacity is less costly than upgrading or replacing SPCs 36, 38. Moreover, considering that only one card, storage card 40, rather than a number of SPCs 36, 38, need be upgraded or replaced, the techniques promote lower costs as well as reduced administrative burden (given that upgrading one card is generally easier than a number of cards).

To illustrate the techniques, consider that IFCs 32, upon receiving a packet, forwards the packet to master SPC 36 or one of slave SPCs 38 for processing, as noted above. When a packet corresponds to a new network session, or a network session that is not yet being monitored by session monitoring device 30, IFCs 32 forward the packet to master SPC 36. In particular, the one of IFCs 32 that received the packet forwards the packet to master SPC 36. On the other hand, when a packet corresponds to a network session that is currently being monitored by session monitoring device 30, which may be referred to as a "recognized network session" or an "existing network session," the one of IFCs 32 that received the packet forwards the packet to the one of the SPCs that is currently processing the network session to which the packet corresponds. IFCs 32 forward packets to master SPC 36 and/or slave SPCs 38 via switch fabric 34.

In some examples, IFCs 32 determine to which of the SPCs to forward a received packet based on forwarding information stored by IFCs 32. That is, IFCs 32, or other units in a forwarding plane of session monitoring device 30, store forwarding tables that indicate output interfaces for received packets based on, for example, the network session of the packets. IFCs 32 may perform the above described lookup using the parsed five-tuple with respect to these forwarding tables. Accordingly, in some examples, the forwarding tables map packets of existing network sessions to a particular one of the SPCs, that is, master SPC 36 or one of slave SPCs 38. When the packet corresponds to a new network session, there would not be an entry in the forwarding tables for the packet, which may trigger a default behavior by IFCs 32 of forwarding the packet to master SPC 36. In this respect, SPCs may be stored as destinations within forwarding tables and assigned addresses or other identifiers such that packets may be directed to these SPCs.

Master SPC 36 allocates new network sessions among slave SPCs 38, e.g., in accordance with the above described load balancing algorithm. Those of skill in the art will appreciate that many such techniques can be utilized to allocate network sessions among slave SPCs 38. For example, the load balancing techniques may take into account a number of network sessions being processed by each of slave SPCs 38, a type of application or protocol in use for the network sessions, calculated statistics such as average session throughput over a period of time, or other such characteristics. In some examples, master SPC 36 additionally processes packets, that is, master SPC 36 may assign itself a subset of network sessions of which to process packets. In other examples, master SPC 36 fills an administrative role for session monitoring device 30 and slave SPCs 38, without actively processing packets of network sessions. After assigning one of slave SPCs 38 to process packets of the new network session, master SPC 36 forwards the packet to the assigned one of slave SPCs 38.

As noted above, each of master SPC 36 and slave SPCs 38 include respective local memories or caches for storing session data for the respective subset of the network sessions processed by the corresponding SPCs. In general, master SPC 36 stores a session table that identifies all actively monitored network sessions and the corresponding one of slave SPCs 38 that is monitoring the corresponding network session. Each of slave SPCs 38 monitor, that is, process packets of, a subset of the set of network sessions being monitored by session monitoring device 30. Slave SPCs 38 each store local session tables that identify network sessions being monitored by the respective one of SPCs 38, and cache data for monitored sessions having recent activity. Master SPC 36 and slave SPCs 38 store network session information to storage card 40 via switch fabric 34.

In this manner, SPCs 38 store network session information for monitored network sessions for which there has not been relatively recent activity to storage card 40, freeing up cache availability for session state information for other, more recently active network sessions. Accordingly, each of SPCs 38 locally cache session state information for most recently active network sessions, while offloading storage of session state information for less recently active network sessions to storage card 40, which generally stores session state information for each of master SPC 36 and slave SPCs 38.

In addition to the session state information, each of SPCs 38 locally store session header information for each of the network sessions monitored by the respective one of SPCs 38. As described in greater detail below, session information includes both session header information, which identifies the corresponding network session, a location of session body information, and other information that is stored on the respective one of SPCs 38 for the life of the network session. Where this disclosure refers to session data that is offloaded to storage card 40, the session data corresponds to session body information, which includes information such as the determined session state for the network session.

Storage card 40 includes one or more computer-readable storage media to store the session state information. The storage media may include, for example, a hard drive, a solid state drive, a flash drive, a magnetic medium, an optical medium, and/or tape-based media. In some examples, storage card 40 includes a memory management unit that organizes data stored to storage card 40, for example, by selecting which of a plurality of computer-readable storage media to write received data, determining where data for which a received read or access request is stored and retrieving and providing the requested data, performing garbage collection, and other memory management tasks.

The computer-readable storage media of storage card 40 store session data for each of the network sessions monitored by session monitoring device 30. The session data stored by storage card 40 includes the session header data and session body data for each of the network sessions being processed by master SPC 36 and slave SPCs 38. In this manner, master SPC 36 and slave SPCs 38 are able to use storage card 40 as long-term storage, while local memories of master SPC 36 and slave SPCs 38 can be used as caches that temporarily store data of network sessions that have had recently been processed by corresponding ones of master SPC 36 and slave SPCs 38.

Master SPC 36 retains a global view of the network sessions being processed by session monitoring device 30 by storing the session hash table described below in more detail.

Accordingly, master SPC 36 is able to allocate new network sessions to slave SPCs 38 in a way that distributes the network sessions among slave SPCs 38, to avoid causing the SPCs to become overloaded. That is, because master SPC 36 stores the session hash table, master SPC 36 is able to determine how many network sessions are assigned to each of slave SPCs 38, such that master SPC 36 can assign new network sessions to slave SPCs 38 with relatively lower work loads. However, master SPC 36 need not store the session body information, e.g., the current network session state, for each of the active network sessions; this data is instead stored by the corresponding one of slave SPCs 38 and/or storage card 40.

Storage card 40 stores session data for each of the network sessions being processed by session monitoring device 30. Accordingly, when one of slave SPCs 38 needs access to session data for a particular network session that is not cached in the memory of the slave SPC, this one of slave SPCs 38 can retrieve the session data from storage card 40 via switch fabric 34. Upon retrieving the session data from storage card 40, this one of slave SPCs 38 stores the retrieved session data for the network session to the memory, which acts as a cache for the session data. In this respect, slave SPCs 38 generally cache session data for recently active network sessions, while offloading session data for sessions that have not been recently active to storage card 40, e.g., using a least recently used replacement algorithm.

As one example, each of slave SPCs 38 stores a queue-like data structure for which the element representative of the most recently active network session is moved to the head of the queue. When the memory storing the queue becomes full, each of slave SPCs dequeues and removes the tail of the queue, which corresponds to the least recently used element, which is also typically the least recently active network session. In this manner, slave SPCs 38 store fast access to session data for recently active network sessions, while still being able to efficiently retrieve session data for less recently active network sessions. Consequently, addition of storage card 40 in accordance with the techniques described in this disclosure may improve scalability in terms of storing network storage data without overly impacting packet processing.

Figure 2A:
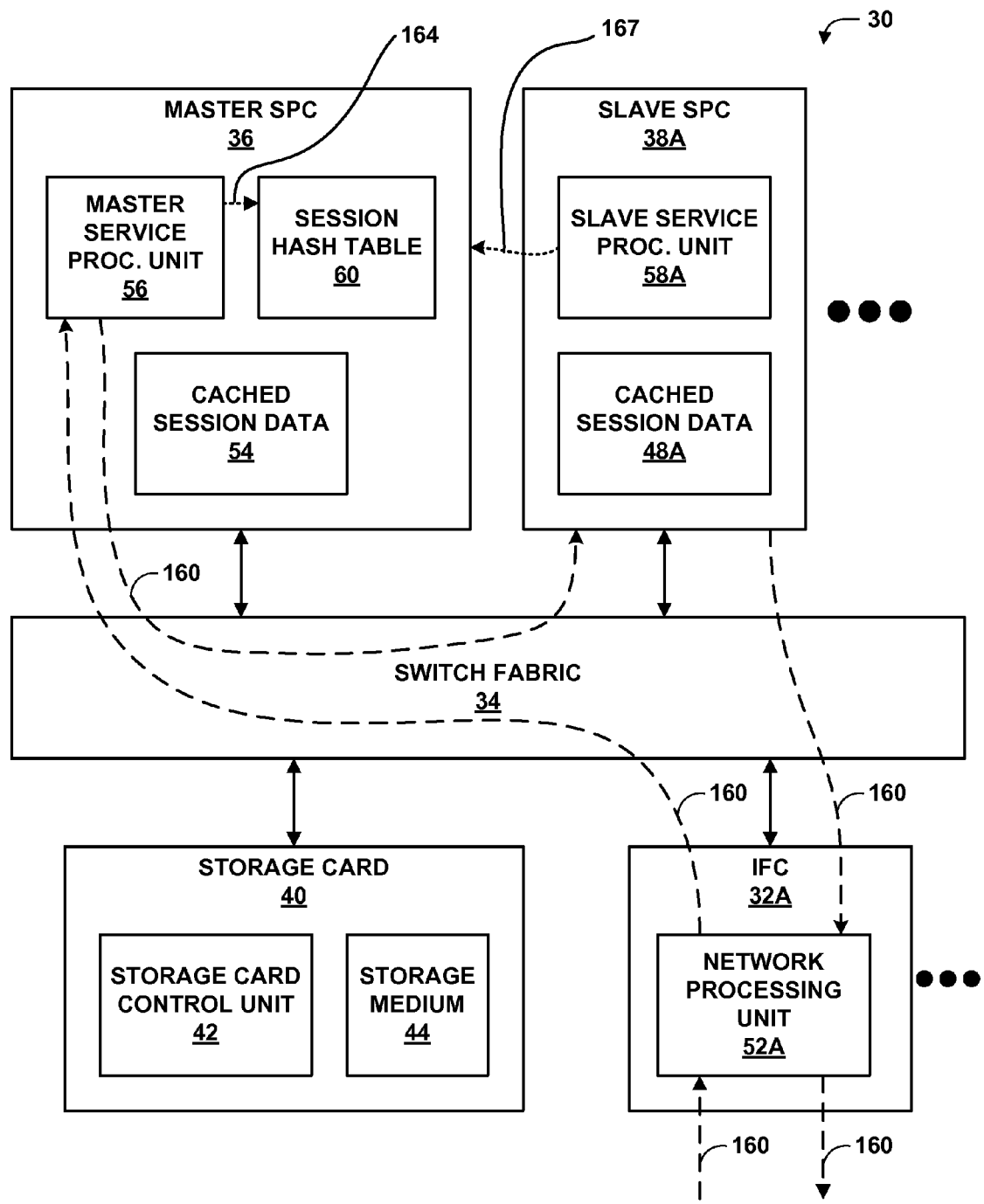
FIGS. 2A & 2B are block diagrams illustrating an example set of components of a session monitoring device in greater detail, and example paths of packets through the session monitoring device based on whether an interface card recognizes a network session of the packets.

FIG. 2A is a block diagram illustrating an example set of components of session monitoring device 30 in greater detail. In the example of FIG. 2, master SPC 36 includes master service processing unit (master SPU) 56, session hash table 60, and cached session data 54. Slave SPC 38A includes slave service processing unit (slave SPU) 58A and cached session data 48A. Storage card 40 includes storage card control unit 42 and storage medium 44. IFC 32A includes network processing unit 52A. Although only one slave SPC is shown in the example of FIG. 2 for ease of illustration purposes, any number of slave SPCs may be included in session monitoring device 30, as indicated by the ellipses beside slave SPC 38A. Likewise, the ellipses beside IFC 32A indicate that session monitoring device 30 includes more IFCs similar to IFC 32A, in some examples.

Initially, master SPU 56 receives packets corresponding to new or otherwise unknown network sessions and assigns the network session to one of slave SPCs 38. Master SPU 56 stores session hash table 60 to keep track of which network sessions are being processed by which ones of slave SPCs 38. In general, session hash table 60 includes a number of "buckets," to which sessions are mapped based on the five-tuple {source IP address, destination IP address, source port, destination port, protocol}. Master SPU 56 executes a hash function on a combination of the values for this five-tuple that maps each network session to one of the buckets. By storing only a fraction of the session information for each session (that is, the session header information only), master SPC 36 is capable of storing information for all presently monitored network sessions, without overburdening local memory resources.

In some examples, session hash table 60 is implemented as a set of linked list data structures, where each bucket is represented by a pointer for a linked list that points to a null value when the bucket is empty or to a first session header value. Each of the session header values also includes at least one pointer to either a null value when the session header value is the last element of the bucket or a subsequent header value for the bucket. In some examples, session hash table 60 is implemented as a doubly linked list, in which additional pointers in the headers point to previous header values in the bucket. In some examples, the linked list (or doubly linked list) forms a ring, such that the last entry (the "tail" of the ring) points to the first entry (or "head" of the ring). In such examples, there is one ring for each bucket of session hash table 60. Session hash table 60 also, in some examples, provides head and tail pointers, where the head pointer points to the first entry of the list and the tail pointer points to the last entry of the list, to be able to quickly determine the head and tail entries, and to quickly and efficiently replace the tail entry with a new head entry.

Master SPC 36 stores session hash table 60 in local memory, such as in random access memory (RAM). That is, master SPC 36 does not offload data for session hash table 60 to storage card 40, but instead stores session hash table 60 locally in quickly available local memory. Because session hash table 60 stores only session header data and not session body data, such as session state information, session hash table 60 can reside in local memory without overburdening the memory of master SPC 36.

Master SPC 36 also includes cached session data 54, which may be stored in the same memory as session hash table 60 or a separate memory. Regardless, master SPC 36 stores cached session data 54 to a local memory of master SPC 36. In particular, master SPC 36 stores cached session data 54 for network sessions being processes by master SPC 36. In examples in which master SPC 36 does not process network sessions, master SPC 36 need not include cached session data 54.

In some examples, master SPC 36 stores session header data that identifies particular flows in cached session data 54 and stores identifiers for (e.g., pointers to) the session header data in session hash table 60. Master SPC 36 is therefore capable of offloading session header data from cached session data 54 to storage card 40. In this manner, identifiers for all active sessions are always available to master SPC 36, although master SPC 36 may need to retrieve additional session header information from storage card 40. The session headers in such examples include data that identifies the session such as, for example, network five-tuples for the flows of the session. The session header may further include a semaphore, a session ager, and a session body identifier. Elements of hash table 60 may include pointers that include identifiers of storage locations of the corresponding session header. In this manner, both master SPC 36 and slave SPCs 38 may utilize storage card 40 to offload cached data, but master SPC 36 may nevertheless maintain a global view of the session information.

Slave SPC 38A is an example representative of slave SPCs 38. Each of slaves SPCs 38 generally includes components similar to those of slave SPC 38A. In the example of FIG. 2A, slave SPC 38A includes slave SPU 58A. Slave SPU 58A processes packets of packet flows corresponding to network sessions assigned to slave SPC 38A by master SPC 36. Slave SPU 58A performs various types of processing, based on the type of processing required. In some examples, e.g., where session monitoring device 30 corresponds to an intrusion detection and prevention (IDP) device, slave SPU 58A performs IDP tasks, such as detecting attempted intrusions, blocking or rate-limiting network sessions and connection requests from one or more network devices when attempted intrusions are detected, determining whether packets correspond to viruses, spyware, or other malware, determining whether a man-in-the-middle attack is being attempted, or other such processing tasks. In other examples, SPU 58A processes packets of network sessions in a manner that supports application acceleration for the network sessions.

In general, processing of packet flows for a network session includes tracking session state, such as transmission control protocol (TCP) state and/or application state. To track session state, in some examples, e.g., for Intrusion Detection and Prevention, slave SPU 58A executes finite state machines such as deterministic finite automata (DFA) for each network session that generally include a set of states including at least one accept state, an input alphabet, and a set of transitions defined according to a current state, a next state, and an element of the input alphabet, where the state machine transitions from one state to another based on the set of transitions. In some examples, finite state machines referred to as nondeterministic finite automata (NDFA) provide lambda transitions that permit transitions from one state to another without receipt of an element of the input alphabet. For each network session monitored by slave SPC 38A, slave SPU 58A executes a corresponding DFA or NDFA, in some examples, and stores the current state for the network session in cached session data 48A. In some examples, slave SPU 58A stores additional data for the session body in cached session data 48A, such as, for example, flow type indicating a type of flow for a flow of the session, five-tuples for the flows of the session, a services list indicating services to be performed for the session, an action list indicating actions to be performed upon receipt of a packet of the session, or other such data. Slave SPCs 58 may store pointers to session body data structures in a hash table similar to hash table 60.

In some instances, SPU 58A keeps session body data for recently active network sessions in cached session data 48A. SPU 58A implements a least recently used replacement policy for entries of cached session data 48A. That is, when a memory for cached session data 48A grows too full, SPU 58A removes the least recently used entry, stores the removed entry to storage card 40, and stores a retrieved entry to cached session data 48A. However, SPU 58A keeps session header data for all network sessions being processed by slave SPC 38A stored in local memory. The session header data includes a value that indicates a location of the corresponding session body data, e.g., whether the session body data is stored locally in cached session data 48A or in storage card 40.

Storage card 40 includes storage card control unit 42 and storage medium 44, in the example of FIG. 2A. Storage card control unit 42, in some examples, includes an interface for receiving data to be stored to storage medium 44 of storage card 40, receiving access requests to retrieve data stored by storage card 40, and for providing, in a response, data retrieved from storage medium 44 in response to such requests. In some examples, the interface corresponds to a switch fabric interface that is implemented from an application-specific integrated circuit (ASIC), such as a Juniper 13 chip. In some examples, a field programmable gate array (FPGA), such as a Juniper Swan Hill FPGA, is used as a switch fabric interface for storage card control unit 42. Storage card control unit 42 may be implemented in a combination of hardware, software, and/or firmware. Storage card control unit 42 also includes control logic for storing and retrieving data to and from storage medium 44. The control logic, in some examples, is a general purpose central processing unit (CPU) executing Linux to retrieve data from and store data to storage medium 44. The control logic, in some examples, additionally includes an FPGA or an ASIC based acceleration engine, such as, for example, a TCP/IP Offload Engine (TOE), which can be used to achieve a higher throughput for an Internet Small Computer System Interface (iSCSI).

Master SPC 36, slave SPCs 38, and storage card 40, in some examples, exchange data according to the iSCSI protocol via switch fabric 34. An example implementation of session monitoring device 30 has demonstrated a throughput of 10 Gbps, which provides sufficient bandwidth to swap session data between SPCs and storage card 40.

In some examples, slave SPCs 38 store pointers to session body data of network sessions in the form of session identifiers, rather than as memory addresses. Accordingly, in such examples, storage card control unit 42 determines where in storage medium 44 session body data is stored based on a session identifier. Thus storage card control unit 42 is able to receive access requests for session body data that identify the requested session body based on a session identifier, rather than, for example, a memory address. In some examples, storage card control unit 42 manages a table or other data structure that indicates where in storage medium 44 particular session body data is stored.

In some examples, storage card 40 includes more than one storage medium 44. In some examples, storage card 40 includes two or more hard disks and/or solid state drives, or other such storage media. Thus certain entries of session body data may be stored to one storage medium while other entries of the session body data may be stored in another storage medium. Storage card control unit 42 maintains a mapping between session identifiers and which one of the storage media, as well as a location within the storage media, the entries of session body data are stored, in such examples.

In this manner, storage card 40 permits session monitoring device 30 to store many entries for many monitored network sessions, yet slave SPCs 38 retain fast access to recently active network sessions, due to caching the session information for recently active network sessions locally. Swaps between local memory of slave SPCs 38 can be relatively rare, yet can also be achieved quickly due to interconnection by switch fabric 34 and storage and retrieval being controlled by storage card control unit 42. Supposing, for example, that one network session entry occupies one kilobyte of data, each gigabyte of storage provided by storage card 40 allows for one million network session entries.

IFC 32A includes network processing unit (NPU) 52A in the example of FIG. 2A. NPU 52A generally receives and outputs packets to and from one or more of network devices 20, for example, via a network. Upon receiving a packet, NPU 52A performs a session lookup to determine whether a session for the packet has already been created by session monitoring device 30. If not, NPU 52A forwards the packet to master SPC 36. Otherwise, NPU 52A forwards the packet directly to the SPC, i.e., one of slave SPCs 38 in this example, that is processing the network session to which the packet corresponds.

In some examples, IFC 32A updates a forwarding table based on an assignment of a network session to be processed by one of slave SPCs 38 to indicate that packets of the network session are to be forwarded directly to the one of slave SPCs 38 to which the network session was assigned. In some examples, IFC 32A updates the forwarding table to map the packets of the network session to a logical interface associated with the one of slave SPCs. In some examples, IFC 32A performs a lookup by sending a request to master SPC 36, which refers to session hash table 60 to determine whether a network session exists for the received packet and, if so, which of slave SPCs 38 has been assigned to process the network session, and sends a response to IFC 32A indicative of these determinations.

FIG. 2A additionally illustrates an example processing path through session monitoring device 30 with respect to an exemplary packet 160 that corresponds to a new network session. This processing path is commonly referred to as the "slow path" in that session monitoring device 30 performs additional operations to process packets corresponding to new network sessions that it normally would not have to take for packets that correspond to already established network sessions. These extra operations take additional time compared to the processing of packets corresponding to already established session and consequently this processing path is referred to as the "slow path." The path for processing packets corresponding to already established network sessions is referred to as a "fast path" considering this path takes less time to process a packet when compared to the packet processing time of the "slow path." FIG. 2A illustrates this "fast path" while FIG. 2B, which is discussed below, illustrates the "fast path."

To illustrate slow path processing, assume IFC 32A receives a packet 160 (where packet 160 is denoted as a dash-lined arrow), whereupon NPU 52A of IFC 32A performs a lookup to determine whether the packet belongs to a monitored network session. For purposes of example, it is presumed that the packet does not belong to an existing network session so as to illustrate slow path processing, and as a result, NPU 52A forwards packet 160 to master SPC 36 via switch fabric 34.

Master SPU 56 receives packet 160 and creates a pending session for the new network session corresponding to the received packet. To create the pending session, master SPU 56 executes a hash function on the five-tuple of the network packet to assign the network session to a bucket of session hash table 60. Master SPU 56 then creates a new entry for the network session in the bucket resulting from the calculated hash function of session hash table 60. Master SPU 56 also executes a load balancing algorithm to select one of slave SPCs 38 to process packets of the new network session. The use of session hash table 60 provides fast access to header data for each monitored network session, and the buckets of session hash table 60 are not necessarily related to slave SPCs 38. Master SPU 56 sets an SPC identifier value of the new entry in session hash table 60 to indicate to which of slave SPCs 38 the new network session has been assigned, and forwards packet 160 to the selected one of slave SPCs 38 (slave SPC 38A, in this example). Master SPU 56 also sets a timer, also referred to in this disclosure as an "ager," that is set to expire within a certain period of time, e.g., two seconds.

Upon receiving packet 160 that corresponds to the new network session, slave SPU 58A, in this example, creates a new session and sends an acknowledgement 167 that acknowledges receipt of packet 160 and the new network session to master SPC 36. If master SPC 36 does not receive an acknowledgement before the ager expires, master SPC 36 deletes the newly created session data from session hash table 60 and the assignment fails, prompting the sending device to resend the packet, which causes session management device 30 to retry the assignment of the network session to one of slave SPCs 38. Alternatively, master SPC 36 may attempt, in some examples, to reassign the network session to a different one of slave SPCs 38. For purposes of example, it is assumed that slave SPU 58A successfully creates a new session and outputs acknowledgement 167 to master SPC 36.

In general, slave SPU 58A creates the new session by constructing a new set of session data, including both session header and session body data, and storing this new set of session data to cached session data 48A, as the newly created session will be the most recently active network session for slave SPC 38A. SPC 38A also processes packet 160, e.g., by performing IDP services that involve initializing a corresponding DFA or NDFA and executing state transitions based on the content of packet 160, and saving the resulting session state to cached session data 48A. After processing packet 160, slave SPU 58A passes packet 160 back down to an element of the forwarding plane, i.e., IFC 32A in this example. IFC 32A then determines an output interface for packet 160 based on the destination identified in the header of packet 160 and routing/forwarding information stored by session management device 30. IFC 32A then forwards packet 160 to its nexthop, which in this example is assumed to be another port on IFC 32A. IFC 32A then outputs packet 160 toward the destination of the corresponding packet flow for the network session. Although shown as IFC 32A, the output interface may correspond to any of IFCs 32, and in particular, corresponds to the one of IFCs 32 that is coupled to a network element along a route to the destination device for the network session.

When a network session terminates, the one of slave SPCs 38 monitoring the network session generally deletes the network session. In some examples, when the one of slave SPCs 38 determines that the network session is malicious, the one of slave SPCs 38 does not delete the session, but instead stores session information that indicates that connection attempts from one or both participants of the network session should be refused or rate limited, or to record other corrective action taken with respect to the network session. When deleting a network session from an SPU, the SPU sends a reliable "invalidate session" message to master SPC 36. Master SPU 56, in turn, invalidates the session, starts an ager timer for a certain amount of time, e.g., two seconds, and sends an acknowledgement message to the SPU. The invalidated session in master SPU 56 will be deleted after the timer expires.

In general, session data accesses are packet or event triggered, such that slave SPUs 58 can prefetch session data from storage card 40. In some cases, session access is triggered in the middle of service, such as, for example, a parent service access triggered by a child session that can't be prefetched. In this case, an entire hardware thread that processes the parent and child sessions can be blocked until the sessions are loaded into a corresponding one of cached session data 48.

Figure 2B:
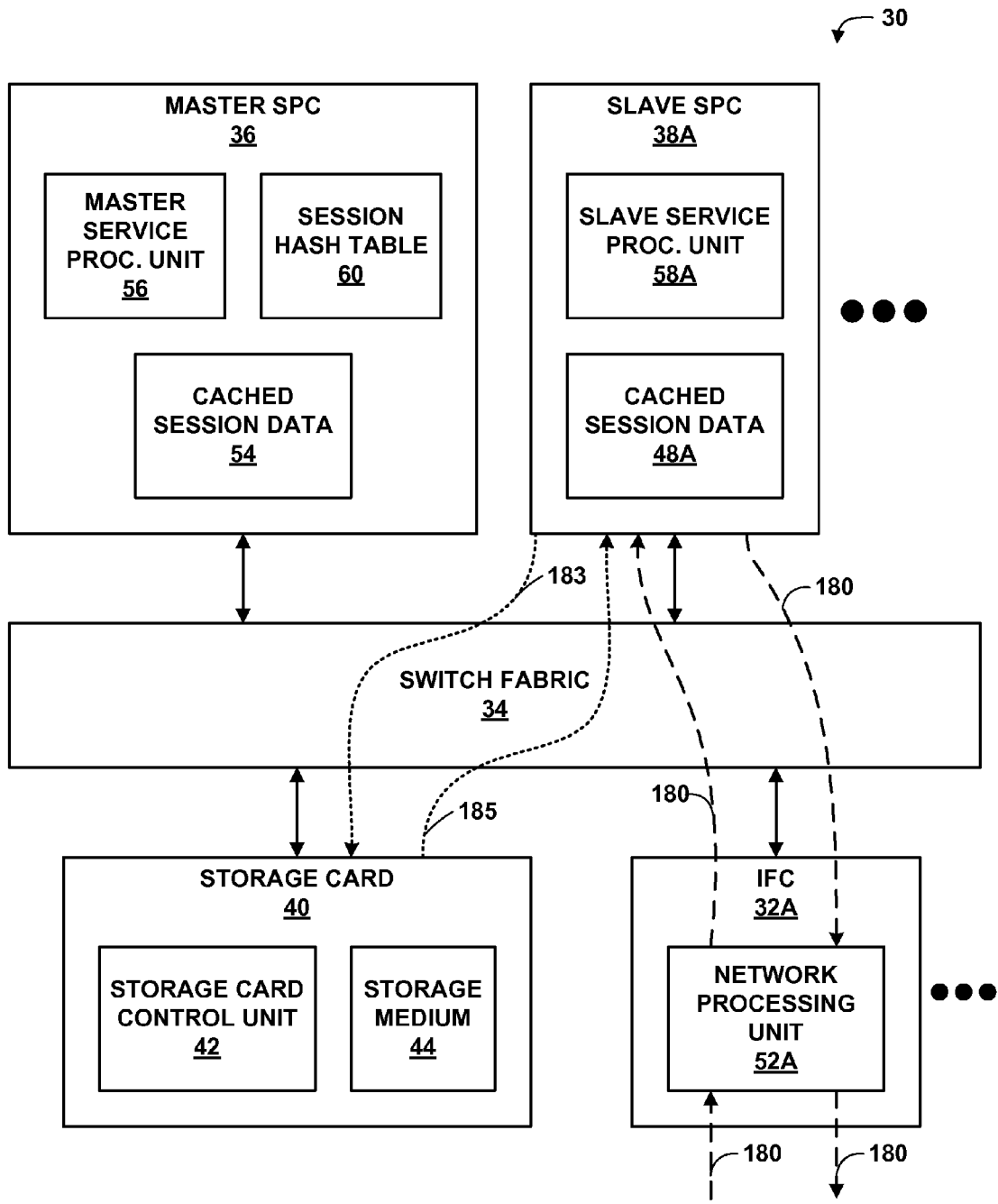

FIG. 2B is a block diagram that illustrates another processing path through network monitoring device 30 with respect to an exemplary packet 180 that corresponds to a previously established or active network session. The elements of session management device 30 depicted in the example of FIG. 2B are substantially similar to those depicted in FIG. 2A, but as noted above FIG. 2B illustrates a different path, again as a dash-lined arrow, for received packet 180. Initially, IFC 32A receives packet 180. NPU 52A determines, in this example, that packet 180 corresponds to an existing network session in a manner similar to that described above used to determine that packet 160 corresponds to a new network session. Assuming that packet 180 corresponds to an existing network session, again for purposes of illustration, IFC 32A forwards packet 180 directly to the one of slave SPCs 38 identified via the lookup, which is slave SPC 38A in the example of FIG. 2B.

Upon receiving packet 180, slave SPU 58A determines whether session body data is currently stored in cached session data 48A. If not, slave SPU 58A issues a request 183 that requests the session body data from storage card 40 via switch fabric 34. Slave SPU 58A typically uses the session header data (which is stored locally, without being exported) to determine a session identifier for the network session corresponding to the received packet and issues request 183 to storage card 40 that indicates the session identifier. In response to this request 183, storage card 40 outputs a response 185 that includes the requested session body data. In this respect, by storing the session header data locally, session data for multiple sessions can be loaded through the use of a pipeline that retrieves the session data at substantially similar times, rather than sequentially. Slave SPU 58A places the session body data at the head of the data structure used to store data for cached session data 48A, to indicate that the session body data is the most recently used session body data. Slave SPU 58A then processes received packet 180 and updates session data for the corresponding network session, e.g., to reflect changes to the state of the network session specified by packet 180.

After processing packet 180, slave SPC 38A forwards packet 180 back to an element of the forwarding plane, e.g., IFC 32A in the example of FIG. 2B. As in the example of FIG. 2A, IFC 32A then determines a destination for packet 180 and packet 180 is output by one of IFCs 32 that is coupled to a network element along a route to the destination for the packet. In some examples, NPU 52A does not store information that indicates the one of slave SPCs 38 to which the network session of a received packet corresponds. In such cases, NPU 52A forwards the packet first to master SPC 36, which performs a lookup in session hash table 60 to determine to which of slave SPCs 38 the network session is assigned, then forward the packet to the correct one of slave SPCs 38.

Master SPU 56, slave SPU 58A, storage card control unit 42, and NPU 52A may be implemented in hardware, software, firmware, or any combination thereof. For example, dedicated hardware units, such as digital signal processors (DSPs), application specific integrated circuits (ASICs), and field programmable gate arrays (FPGAs) may be constructed that are hard-wired to perform the functionality attributed to master SPU 56, slave SPU 58A, storage card control unit 42, and NPU 52A, respectively. Alternatively, instructions that cause a processor, when executed, to perform the functionality attributed to master SPU 56, slave SPU 58A, storage card control unit 42, and NPU 52A may be encoded in a computer-readable storage medium, read only memory (ROM), programmable read only memory (PROM), erasable programmable read only memory (EPROM), electronically erasable programmable read only memory (EEPROM), flash memory, a hard disk, a CD-ROM, a floppy disk, a cassette, magnetic media, optical media, or other computer-readable storage media.

Figure 3:
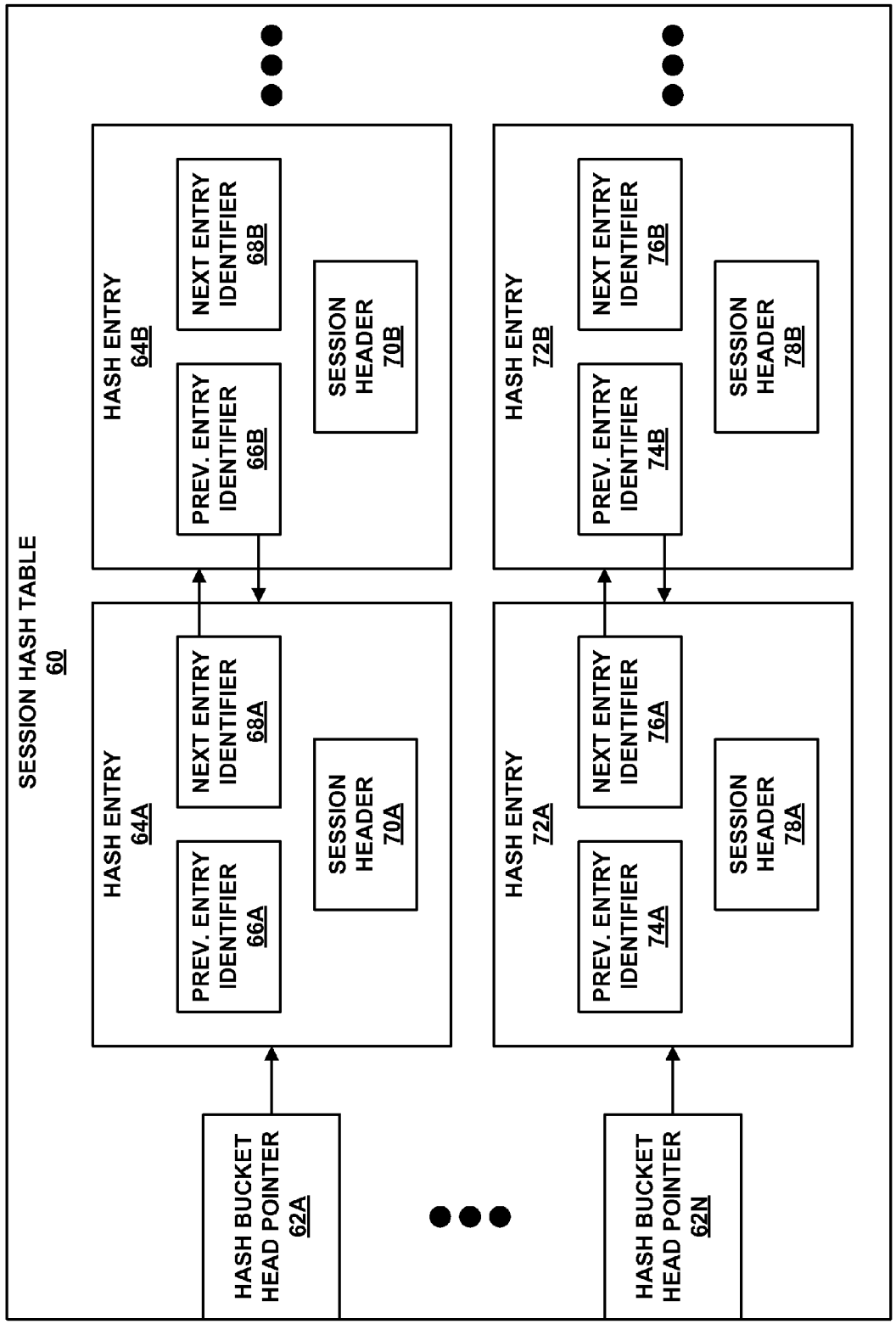
FIG. 3 is a block diagram illustrating an example implementation of a session hash table.

FIG. 3 is a block diagram illustrating an example implementation of session hash table 60. In the example of FIG. 3, session hash table includes hash bucket head pointers 62A-62N (hash bucket head pointers 62). In general, each of hash bucket head pointers corresponds to a bucket of session hash table 60, that is, a potential value resulting from the execution of a hash function on a network five-tuple of a received packet. In some examples, the "pointers" are actually session identifiers, rather than memory addresses at which the pointed-to session header is stored.

The same session identifier can be used for both packet flows of the corresponding network session, and a single bit can be used to designate either "wing zero" or "wing one," that is, the packet flow, for the network session, which allows for a savings of bits over the use of a conventional pointer comprising a memory address, in some examples. For example, the session identifier information can be stored in 31 bits, with an additional bit to designate the wing, that is, the packet flow, of the network session. Each of hash bucket head pointers 62 points to a head of a queue data structure storing zero or more hash entries. When a bucket has zero hash entries, the corresponding one of hash bucket head pointers 62 points to a null value. When there is a hashing collision for a session managed by one of slave SPUs 38, each hash entry of the corresponding hash bucket is loaded into the cache for the one of slave SPUs 38.

When a bucket includes at least one hash entry, the corresponding one of hash bucket head pointers 62 points to the first hash entry for the bucket. In the example of FIG. 3, hash bucket head pointer 62A points to hash entry 64A. Hash entries 64A and 64B (hash entries 64) include respective previous entry identifiers 66, next entry identifiers 68, and session headers 70. Previous entry identifiers 66 point to previous entries in the corresponding bucket. In the example of FIG. 3, previous entry identifier 66A points to a null value, as hash entry 64A is the first entry in the bucket, while previous entry identifier 66B points to hash entry 64A.

Next entry identifier 68A points to hash entry 64B, in this example. Assuming the bucket includes additional entries, next entry identifier 68B points to the next entry of the bucket. When the bucket includes no additional entries, next entry identifier 68B points to a null value.

Session header 70A includes session header data for a network session corresponding to hash entry 64A. In general, session header 70A includes a session identifier that indicates to which of the network sessions that session header 70A corresponds. When master SPU 56 initially creates a session header for a new network session and assigns the new network session to one of slave SPCs 38, master SPU 56 also initializes an ager timer, which master SPU 56 stores in session headers, such as session header 70A.

Hash entries 72A and 72B (hash entries 72) include similar elements previous entry identifiers 74, next entry identifiers 76, and session headers 78 that generally include similar data with similar uses as previous entry identifiers 66, next entry identifiers 68, and session headers 70, respectively. In the example of FIG. 3, hash entries 64 correspond to the bucket for hash bucket head pointer 62A, while hash entries 72 correspond to the bucket for hash bucket head pointer 62N. Accordingly, in this example, hash bucket head pointer 62N points to hash entry 72A, the first entry of hash entries 72.

Figure 4:
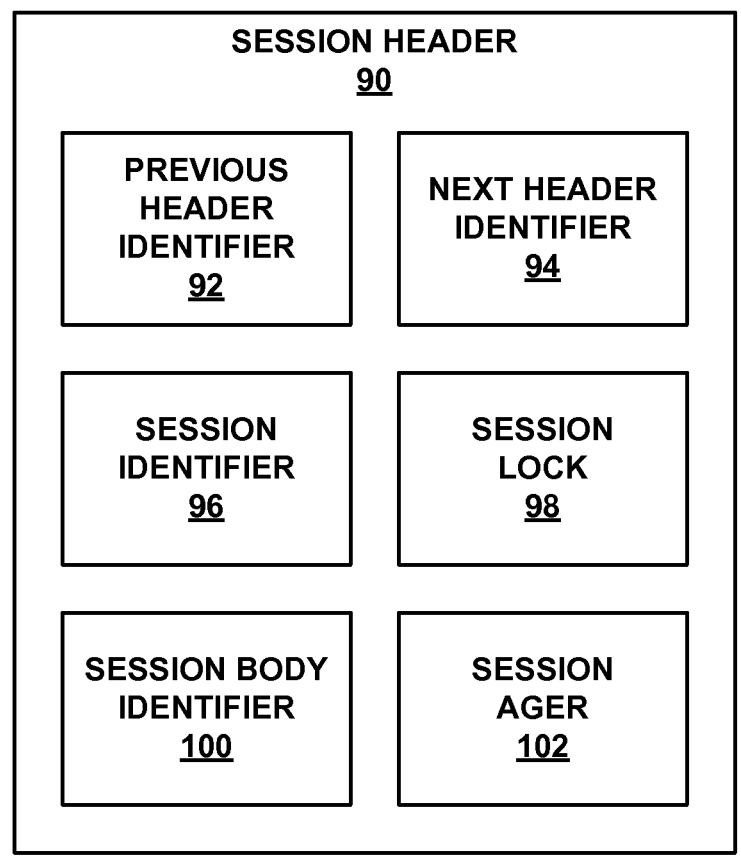
FIG. 4 is a block diagram illustrating data elements of an example session header.

FIG. 4 is a block diagram illustrating data elements of an example session header 90. Session headers 70, 78 generally include data similar to session header 90. In addition, session headers stored and managed locally by slave SPUs 58 also include data similar to session header 90. In the example of FIG. 4, session header 90 includes previous header identifier 92, next header identifier 94, session identifier 96, session lock 98, session body identifier 100, and session ager 102. Because hash entries 64, 72 include previous entry identifiers 66, 74 and next entry identifiers 68, 76, respectively, session headers 72, 78 need not, in some examples, include previous header identifier 92 and next header identifier 94. Alternatively, in some examples, session headers 70, 78 include previous header identifiers and next header identifiers and hash entries 64, 72 do not include previous entry identifiers and next entry identifiers.

Previous header identifier 92 generally includes an identifier of the session header occurring before session header 90. When session header 90 is managed by one of slave SPUs 58, in some examples, session header 90 occurs in a ring-structure, in which case if session header 90 is the "head" of the ring, previous header identifier 92 points to the "tail" of the ring. The head of the ring generally corresponds to the most recently active network session managed by the corresponding one of slave SPUs 58, while the tail of the ring generally corresponds to the least recently active network session managed by the corresponding one of slave SPUs 58. Next header identifier 94, similarly, points to the next session header in the ring, when session header 90 is managed by one of slave SPUs 58.

Session identifier 96 includes a unique identifier for the network session corresponding to network session 90. In some examples, session identifier 96 corresponds to a network five-tuple or a pair of network five-tuples where each of the pair of five-tuples corresponds to one of the two packet flows of the network session.

Session lock 98 corresponds to an identifier that indicates whether the network session corresponding to session header 90 is locked. In some examples, session lock 98 comprises a flag, e.g., a binary value. In some examples, session lock 98 comprises a semaphore. In general, session lock 98 can be used by slave SPUs 58 to perform multi-threaded tasks for the network session corresponding to session header 90. For example, one thread can be designated to interface with storage card 40 and maintain a prefetch queue, while one or more other threads are devoted to processing packets of active network sessions and/or creating new sessions.

Session body identifier 100 indicates where current session body data is stored for the network session corresponding to session header 90. When the network session has been recently active, the session body data will be cached in a memory including a corresponding one of cached session data 48 of a corresponding one of slave SPCs 38. Accordingly, when the session body data is cached locally in a memory including one of cached session data 48, session body identifier 100 indicates that the session body data corresponding to session header 90 is cached locally. Alternatively, when the network session has not been recently active, the session body data will be stored in storage card 40. Accordingly, session body identifier 100 will indicate that the session body data is stored in storage card 40.

Session ager 102 corresponds to a timer that is set by, for example, master SPU 56 after a received packet of a new network session has been forwarded to one of slave SPCs 38. If the timer expires before receiving an acknowledgement from the one of slave SPCs 38, master SPU 56 deletes session header 90 from session hash table 60. In some examples, slave SPUs 58 use session ager 102 to determine whether to remove session body data from a memory caching a corresponding one of cached session data 48. In other examples, when session header 90 is managed by slave SPU 58, session ager 102 is ignored or not included.

Figure 5:
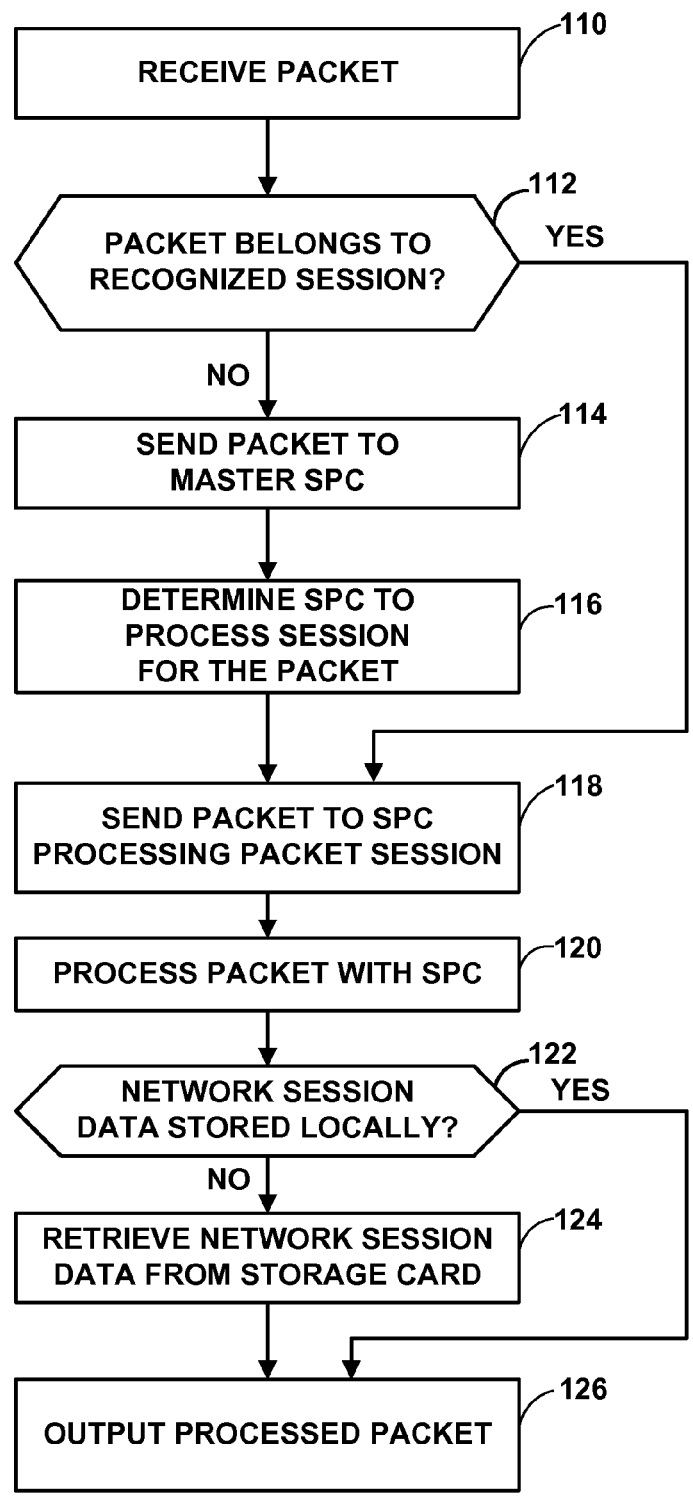
FIG. 5 is a flowchart illustrating an example method for processing a received packet in accordance with the techniques of this disclosure.

FIG. 5 is a flowchart illustrating an example method for processing a received packet in accordance with the techniques of this disclosure. Initially, one of NPUs 52 receives a packet (110). The NPU determines whether the packet belongs to a recognized network session (112). In general, when the NPU that receives the packet includes forwarding information that identifies one of slave SPCs 38 for the packet, the network session corresponding to the packet is considered recognized. Accordingly, when the packet belongs to a recognized session ("YES" branch of 112), the NPU forwards the packet directly to the one of slave SPCs 38 assigned to process the network session corresponding to the packet (118).

When the packet does not belong to a recognized session ("NO" branch of 112), the NPU forwards the packet to master SPC 36 (114). Master SPU 56 then determines one of slave SPCs 38 to which to forward the packet (116). When the packet is part of a new network session, master SPU 56 executes a load balancing algorithm to assign the packet to one of slave SPCs 38. When the packet is part of an existing network session, but the NPU does not have forwarding information to direct the packet to the one of slave SPCs 38 processing the network session, master SPU 56 performs a lookup in session hash table 60 to determine which one of SPCs 38 is processing the network session. In either case, master SPU 56 forwards the packet to the one of SPCs 38 via switch fabric 54 (118).

After receiving the packet, the one of SPCs 38 processes the packet (120). To process the packet, the one of SPCs 38 updates session body data for the network session corresponding to the received packet. Accordingly, the one of SPCs 38 determines whether the session body data is locally cached in a memory including respective cached session data 48 (122). If not ("NO" branch of 122), the one of SPUs 58 retrieves the session body data from storage card 40 (124). When retrieving the session body data from storage card 40, a prefetch command can be initiated to enqueue the packet in a prefetch queue. The one of SPUs 58 then updates the session body data while processing the packet.

Ultimately the one of SPUs 58 sends the packet back to the forwarding plane, e.g., the one of IFCs 32 that received the packet, and session monitoring device 30 outputs the packet according to forwarding information of the forwarding plane (126). In some examples, the one of IFCs 32 refers to forwarding information after the packet has been processed to determine another one of IFCs 32 to which to forward the packet via switch fabric 34, which then outputs the packet.

Figure 6:
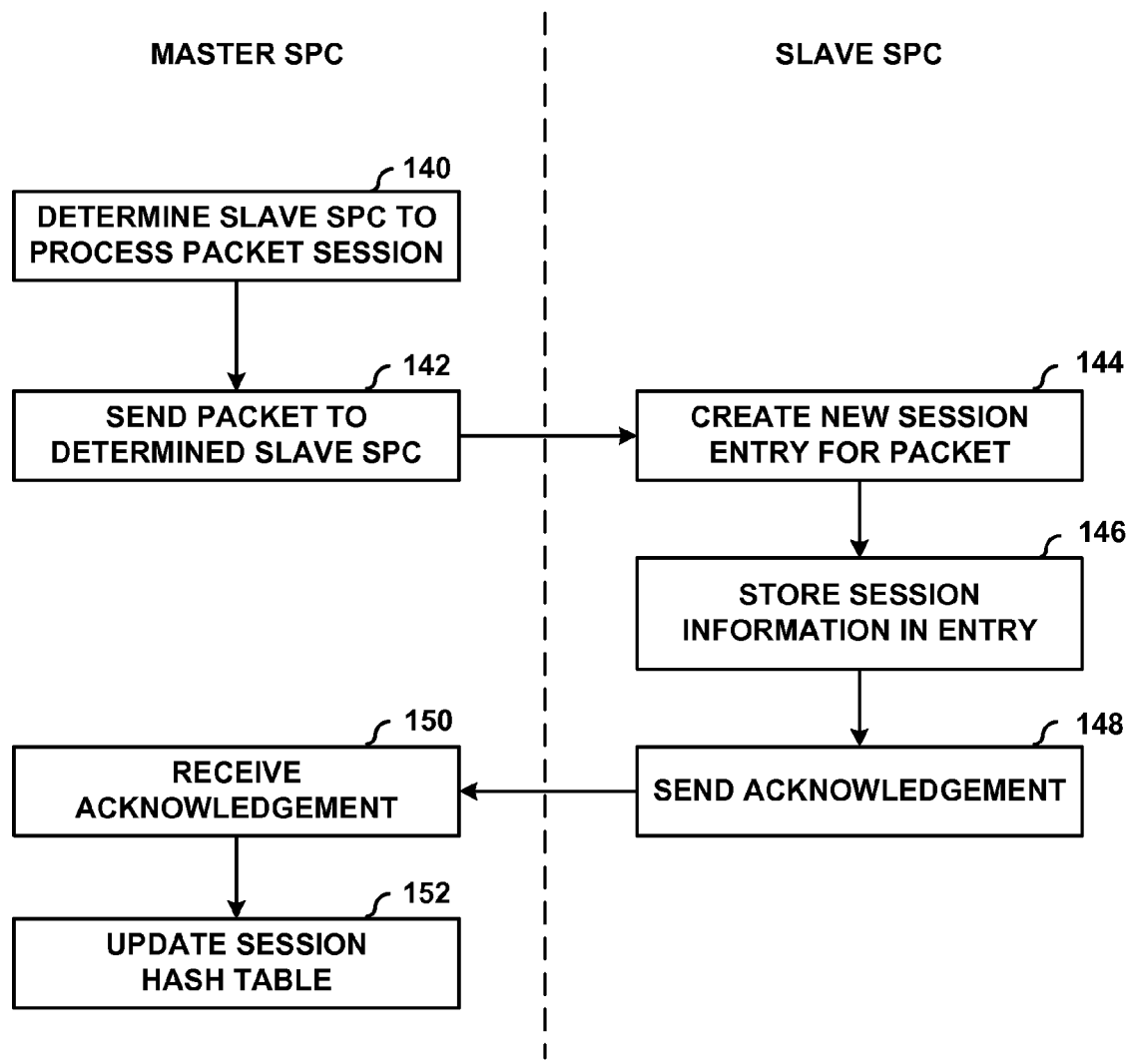
FIG. 6 is a flowchart illustrating an example process for creating network session data for a new network session.

FIG. 6 is a flowchart illustrating an example process for creating network session data for a new network session. In some examples, a network session for a packet is considered to be new when a SYN (synchronization) flag of the packet is set to true. In some examples, the network session is considered to be new when session hash table 60 does not have an entry that includes a session identifier for the network session. With respect to the example method of FIG. 6, initially, after receiving a packet of a new network session, master SPU 56 executes a load balancing algorithm to determine one of slave SPCs 38 to which to assign the new network session (140). Master SPC 38 then sends the packet to the determined one of slave SPCs 38 (142), and in some examples, initiates an ager timer for the network session, e.g., in an entry of session hash table 60.

After the one of slave SPCs 38 receives the packet, the one of slave SPCs 38 creates a new session entry for the network session corresponding to the packet (144). This session entry generally includes both session header data and session body data. The session body data is initially created in the local memory of the one of slave SPCs 38, as the network session is recently active, due to the packet having been received. The one of slave SPCs 38 also stores session information, such as the session identifier and a current session state (e.g., "initialized") in the session header and session body data (156). The one of slave SPCs 38 then sends an acknowledgement to master SPC 36 (148).

Upon receiving the acknowledgement (150), master SPC 36 updates session hash table 60 (152). For example, master SPC 36 disregards the ager for the network session, in examples in which the ager is set, if the acknowledgement is received before the ager timer expires. At this time, the network session information has been successfully created for the new network session. On the other hand, when the acknowledgement is not received before the ager expires, the packet does not get forwarded, causing the source of the packet to retransmit the packet, thus prompting session monitoring device 30 to restart the session creation process.

Figure 7:
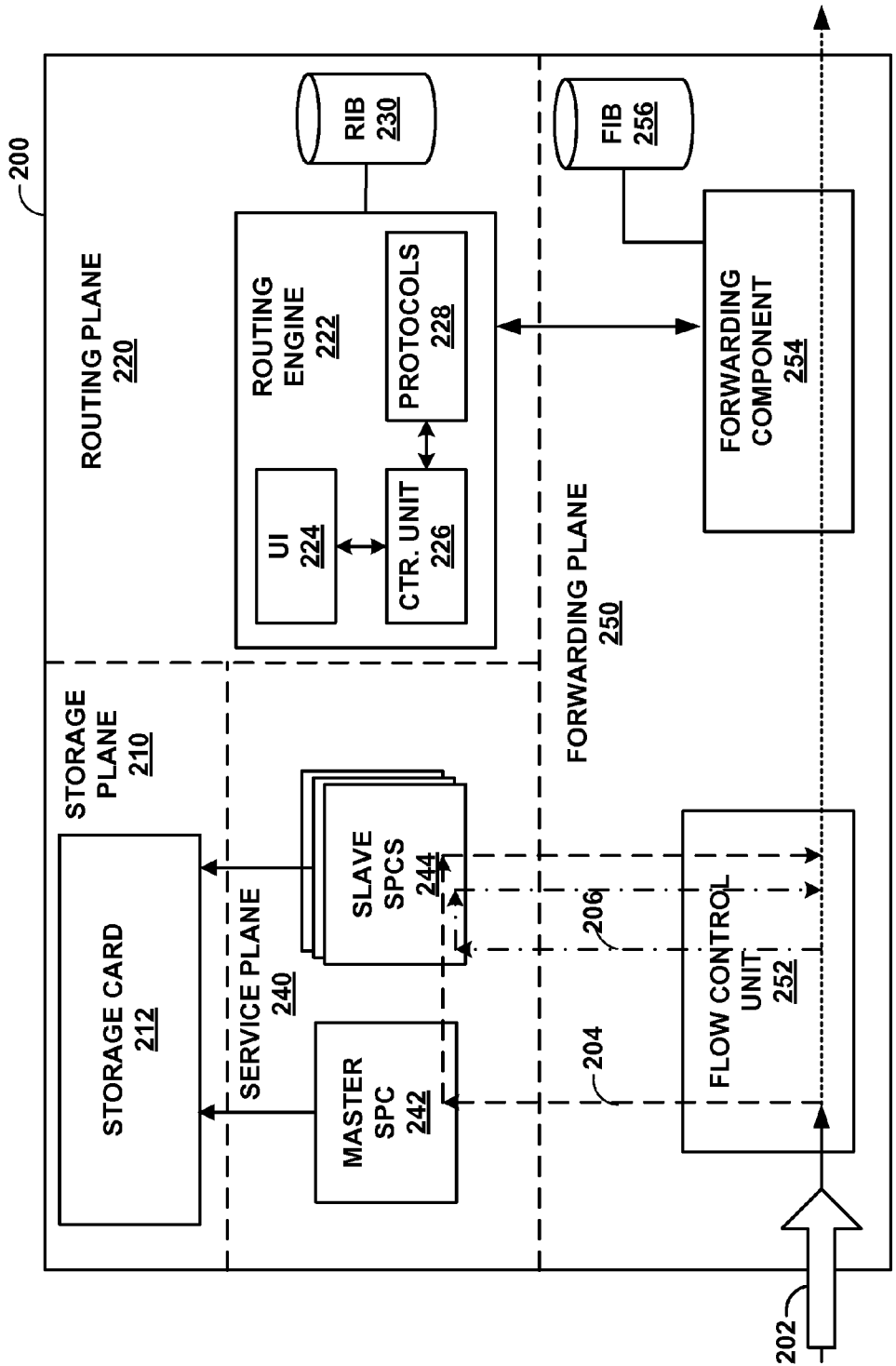
FIG. 7 is a block diagram of an example router that implements the techniques of this disclosure.

FIG. 7 is a block diagram of an example router 200 that implements the techniques of this disclosure. Router 200 includes four operational "planes," storage plane 210, routing plane 220, service plane 240, and forwarding plane 250. Each plane corresponds to a designation of elements that perform a certain task. In the example of FIG. 7, storage plane 210 includes storage card 212, routing plane 220 includes routing engine 222 and routing information base (RIB) 230, service plane 240 includes master SPC 242 and a plurality of slave SPCs 244, and forwarding plane 250 includes flow control unit 252, forwarding component 254, and forwarding information base (FIB) 256. A switch fabric (not shown in FIG. 7) interconnects each of the elements of storage plane 210, routing plane 220, service plane 240, and forwarding plane 250, in some examples.

Storage card 212 includes components similar to storage card 40 (FIGS. 2A and 2B). Likewise, master SPC 242 and slave SPCs 244 perform functions similar to master SPC 36 and slave SPCs 38, respectively. IFCs are generally components of the forwarding plane. Thus, in some examples, flow control unit 252 and forwarding component 254 are implemented in one or more IFCs, such as IFCs 32.

In general, flow control unit 252 directs packets of a received packet flow, such as packet flow 202, to service plane 240 or, in some examples, directly to forwarding component 254. Flow control unit 252, in some examples, includes a forwarding table configured with forwarding information that indicates whether to forward a packet to master SPC 242, a particular one of slave SPCs 244, or, in some examples, directly to forwarding component 254. In some examples, each of master SPC 242 and slave SPCs 244 are associated with respective, different logical interfaces that cause packets to be directed to the appropriate one of master SPC 242 and slave SPCs 244. In some examples, packets are received that are intended for router 200 itself, e.g., packets exchanged between routers in accordance with a routing protocol, in which case flow control unit 252 forwards such packets to routing plane 220.

Routing engine 222 of routing plane 220 includes user interface (UI) 224, control unit (ctr. unit) 226, and routing protocols 228. An administrator (not shown) is able to configure router 200 by interacting with UI 224. Protocols 228 include one or more routing protocols for determining routes through a network, advertising routes through the network, and learning of other routers' routes through the network. Protocols 228 may include one or more of open shortest path first (OSPF), intermediate system to intermediate system (IS-IS), routing information protocol (RIP), border gateway protocol (BGP), interior gateway routing protocol (IGRP), enhanced interior gateway routing protocol (EIGRP), or other routing protocols. An administrator may interact with router 200 via UI 224 to add or remove routing protocols, add, remove, or configure master SPC 242 and/or slave SPCs 244, or perform other configuration tasks.

Control unit 226 executes protocols 228 to determine routing information, such as new routes through a network or existing routes that are no longer available. Control unit 226 stores discovered routes and routing information in RIB 230. Routing engine 222 also updates forwarding information for forwarding component 254 according to updates to RIB 230. For example, when a new route is discovered, forwarding component 254 updates FIB 256 to indicate an IFC via which to output packets along the new route. In this manner, router 200 is able to forward packets along network routes by forwarding the packet out IFCs that lie along the route.

When an IFC in forwarding plane 250 receives a packet of a packet flow, such as packet flow 202, flow control unit 252 refers to the forwarding table to determine whether to forward the packet to master SPC 242 or one of slave SPCs 244. When the packet does not correspond to a network session that is recognized by flow control unit 252, flow control unit 252 forwards the packet to master SPC 242, as shown in packet flow 204, which then either creates a new session entry for a new network session or performs a lookup for an existing network session and forwards the packet to one of slave SPCs 244, accordingly. The path of packets illustrated by 204 in FIG. 7 is also referred to as "slow path," due to the packets passing through both master SPC 242 and one of slave SPCs 244. Alternatively, when the packet corresponds to a recognized network session, flow control unit 252 forwards the packet directly to one of slave SPCs 244, as shown in packet flow 206. The path of packets illustrated by 206 in FIG. 7 is also referred to as "fast path," due to the packets passing only through one of slave SPCs 244. In either case, the one of slave SPCs 244 that received the packet processes the packet and forwards the packet back down to the forwarding plane. Master SPC 242 and slave SPCs 244, in some examples, interact with storage card 212 to retrieve and/or store information regarding the network session to storage card 212.

When flow control unit 252 did not recognize the network session, upon receiving the packet back from one of slave SPCs 244, flow control unit 252 updates forwarding information to reflect that packets of the network session corresponding to the received packet are to be forwarded to the one of slave SPCs 244 from which the packet was received. Flow control unit 252 then forwards the packet to forwarding component 254. Forwarding component 254 determines an output interface via which to forward the packet using forwarding information stored by FIB 256 and outputs the packet.

Although generally described with respect to network sessions, it should be understood that the techniques of this disclosure may also be applied to individual packet flows. That is, the techniques of this disclosure may be applied without determining two packet flows that form a network session. In such examples, packet flow state may be monitored, in addition to or in the alternative to, network session state.

The pseudocode below provides an example implementation of session information (referred to as a "_cp_session") stored by master SPU 56 in entries of session hash table 60:

```
struct _cp_session {
    cp_sess_wing_t sess_wing0;
    cp_sess_wing_t sess_wing1;
    u_int16_t generation_id; /* actual value is currently limited to 8 bits */
    sess_state_enum_t state; /* 8 bits */
    #define SESS_STATE_FREE  0
```

-continued

```
#define SESS_STATE_ALLOCATED  1
#define SESS_STATE_PENDING    2
#define SESS_STATE_VALID      3
#define SESS_STATE_INVALID    4
    spu_id_t spu_id; /* 8 bits */
    u_int32_t spu_sess_id; /* spu session id */
    struct slim_spinlock_s cp_session_lock; /* cp session lock */
    atomic32_t app_cookie_id[CP_SESS_APP_COOKIE_MAX]; /* used by syn cookie.
                                                 Atomic R/W*/
  TAILQ_ENTRY(_cp_session) next;
  ager_entry_t ager_entry; /* Time-age R/W Spinlock */
  uint16_t current_ageout_time;
  uint16_t cp_sess_flag;
#define CP_SESSION_IN_AGER              0x0001 /* Session is installed in the ager */
#define CP_SESSION_AGE_PH0              0x0002 /* Session in Age out phase-0 */
#define CP_SESSION_AGE_PH1              0x0004 /* Session in Age out phase-1 */
#define CP_SESSION_TUNNEL               0x0008 /* Set when CP session is tunnel sess */
#define CP_SESSION_NEED_SERIALIZATION   0x0010 /* serialization reqd */
#define CP_SESSION_P2MP                 0x0020 /* CP session is P2MP */
};
```

The pseudocode below provides an example implementation of a session "wing," that is, a session identifier, as used in the pseudocode for the _cp_session data structure above:

```
struct cp_sess_wing_ {
  int8_t peer_offset;
  int8_t base_offset;
  uint16_t cp_wing_flag;
#define CP_WING_FREE          0x0001 /* Is the session wing in the hash table */
#define CP_WING_INITIATE_SIDE 0x0002 /* this is initiate side.
                                        No lock or atomic */
#define CP_WING_FLAG_IPV6     0x0004 /* indicate this is a v6 wing.
                                        No lock or atomic */
  /* flow_entry and flow_tuple should be next to each other */
  flow_t flow_entry;                 /* Flow hash bucket R/W Spinlock */
  union {
    ipv4_key_t flow_tuple; /* No lock or atomic */
    struct {
      u_int32_t dst_ip;
      u_int32_t src_ip;
      u_int16_t src_port; /* network order */
      u_int16_t dst_port; /* network order */
      u_int16_t sess_token;
      u_int8_t proto;
      u_int8_t resv[1];
    };
  };
};
```

The tables below summarize expected performance metrics for the techniques of this disclosure. Table 1 summarizes the expected number of possible sessions to be monitored based on the storage capacity of storage card 40 based on an assumption of the session header having 12 bytes of data and the session body having 108 bytes of data. The values of Table 1 assume the number of hash buckets is approximately twice the session table size, and that the size of each hash bucket is approximately 12 bytes. Assuming a 2 MB cache of sessions, the session capacity on master SPC 36 is described by the formula (S-2*108)/(12*2+12), where S is the available memory size for the sessions. Accordingly:

TABLE 1

| S(GB)       | 1    | 2    | 3    | 4     | 5     | 6     | 7     |
|-------------|------|------|------|-------|-------|-------|-------|
| Capacity(M) | 22.4 | 50.9 | 79.3 | 107.8 | 136.2 | 164.7 | 193.1 |

The system session capacity is related to three major components: master SPC 36, number and capacity of slave SPCs, and number and capacity of NPUs. In one example, master SPU 56 can handle ten million sessions, each of slave SPUs 58 can handle one million sessions, and each of NPUs 52 can handle two million sessions. In some examples, the session cache is approximately two to five times the session creation rate, which can be expected to minimize impacts on performance of master SPU 56.

The size of a session data structure corresponding to the pseudocode for _cp_session is 108 bytes. Table 2 below illustrates storage requirements for master SPU 56 assuming 108 bytes per session and, alternatively, 200 bytes per session, assuming a 24 byte increase for IPV6 and allowing for future growth:

TABLE 2

| Sessions(M)   | 20  | 32  | 64   | 128  | 200  |
|---------------|-----|-----|------|------|------|
| Size(GB, 108B) | 2.1 | 3.4 | 6.8  | 13.5 | 21.1 |
| Size(GB, 200B) | 3.9 | 6.3 | 12.5 | 25.0 | 39.1 |

Disk write performance is described by the formula "session_creation_rate*size_per_session." When there is a hashing collision, all the sessions in the same bucket can be expected to be loaded in the cache. As the number of buckets is generally twice the number of sessions capacity, according to birthday paradox, the probability of hash collision is >99.9%, but the total number of collision is about:

$$n - d + d\left(\frac{d-1}{d}\right)^n$$

where n is the number of sessions, and d is the number of buckets. Table 3 below illustrates the total number of expected collisions per unit for the number of sessions in millions:

TABLE 3

| n | d | | | | |
|---|---|---|---|---|---|
|   | 2 | 4 | 8 | 16 | 32 |
| 1 | 0.21306117 | 0.115203 | 0.059975 | 0.030609 | 0.015463 |
| 2 | 0.7357587 | 0.426122 | 0.230406 | 0.11995 | 0.061218 |
| 4 | 2.27067043 | 1.471518 | 0.852245 | 0.460812 | 0.239901 |
| 8 | 6.03663124 | 4.541341 | 2.943035 | 1.70449 | 0.921625 |
| 16 | 14.0006709 | 12.07326 | 9.082682 | 5.886071 | 3.408981 |
| 32 | 30.0000002 | 28.00134 | 24.14653 | 18.16536 | 11.77214 |
| 64 | 62 | 60 | 56.00268 | 48.29305 | 36.33073 |
| 128 | 126 | 124 | 120 | 112.0054 | 96.5861 |
| 256 | 254 | 252 | 248 | 240 | 224.0107 |

|   | 64 | 128 | 256 | 512 |
|---|---|---|---|---|
| 1 | 0.007772 | 0.003896 | 0.001951 | 0.000976 |
| 2 | 0.030927 | 0.015544 | 0.007792 | 0.003901 |
| 4 | 0.122436 | 0.061854 | 0.031088 | 0.015584 |
| 8 | 0.479802 | 0.244872 | 0.123708 | 0.062176 |
| 16 | 1.84325 | 0.959604 | 0.489744 | 0.247416 |
| 32 | 6.817962 | 3.6865 | 1.919207 | 0.979488 |
| 64 | 23.54428 | 13.63592 | 7.373001 | 3.838414 |
| 128 | 72.66146 | 47.08857 | 27.27185 | 14.746 |
| 256 | 193.1722 | 145.3229 | 94.17714 | 54.5437 |

Table 3 illustrates that, in the worst case (that is, that the session table is almost full), about 21% of sessions have a collision. So the read throughput is about:
new_session_rate*21%*session_size
Since packet forwarding for existing sessions is only for specific flows or when NPU sessions information is not installed for some reason, these factors are not considered in Table 3.

Usually, disk read performance is better than write performance, especially for flash-based SSDs. Table 4 below provides an expected throughput requirement, in MBps.

TABLE 4

| Session Creation Rate(kcps) | 100 | 200 | 400 | 800 | 1600 |
|---|---|---|---|---|---|
| Session Size(108B) | 10.5 | 21.1 | 42.2 | 84.4 | 168.8 |
| Session Size(200B) | 19.5 | 39.1 | 78.1 | 156.3 | 312.5 |

In the worst case, every new session has a collision. Thus read latency is described by the formula:
Prefetch_queue_depth/New_session_rate
Table 5 below illustrates expected latency requirements for the worst case, in microseconds.

TABLE 5

| Session Creation Rate(Kcps) | 100.0 | 200.0 | 400.0 | 800.0 | 1600.0 |
|---|---|---|---|---|---|
| Prefetch Queue Depth(100) | 1000.0 | 500.0 | 250.0 | 125.0 | 62.5 |
| Prefetch Queue Depth(200) | 2000.0 | 1000.0 | 500.0 | 250.0 | 125.0 |
| Prefetch Queue Depth(300) | 3000.0 | 1500.0 | 750.0 | 375.0 | 187.5 |
| Prefetch Queue Depth(400) | 4000.0 | 2000.0 | 1000.0 | 500.0 | 250.0 |

Assuming a cache prefetching latency of approximately 1 ms, and that the average processing time of a packet is about 100 ms, each of slave SPUs 58 packet performance is approximately 1 Mpps, and session creation rate is about 50 kcps. Further, it is assumed that ager structure is approximately 16 bytes, so the header data structure is approximately 28 bytes, with 12 bytes for the two wings and the session body identifier. The cache size can be about 0.1M (101 ms*1 Mpps). Accordingly, session capacity is described by the formula (S-session_szie*cache_size)/(12*2+28) under these assumptions, where S is the memory size available for the sessions.

Table 6 below provides expected sizes for storage card 40 based on session data structures of one-half and one kilobyte:

TABLE 6

| S(GB) | 0.5 | 1 | 2 | 3 | 4 | 5 |
|---|---|---|---|---|---|---|
| Session Size(0.5 KB) | 8.9 | 18.7 | 38.4 | 58.1 | 77.8 | 97.5 |
| Session Size(1 KB) | 7.9 | 17.8 | 37.5 | 57.2 | 76.8 | 96.5 |

Table 7 below provides expected disk sizes for various numbers of sessions:

TABLE 7

| Session(M) | 1 | 2 | 4 | 8 | 16 | 32 | 64 | 128 | 256 |
|---|---|---|---|---|---|---|---|---|---|
| Size (GB, 0.5 KB) | 0.5 | 1.0 | 2.0 | 4.0 | 8.0 | 16.0 | 32.0 | 64.0 | 128.0 |
| Size (GB, 1 KB) | 1 | 2 | 4 | 8 | 16 | 32 | 64 | 128 | 256 |

Session performance can be approximately described by the formula session_load_rate*session_size. Table 8 below provides expected disk performance (in MBps) for different session load rates.

TABLE 8

| Session Load Rate(Ksps) | 100 | 200 | 400 | 800 | 1600 | 3200 |
|---|---|---|---|---|---|---|
| Session Size(0.5 KB) | 50 | 100 | 200 | 400 | 800 | 1600 |
| Session Size(1 KB) | 100 | 200 | 400 | 800 | 1600 | 3200 |

In the worst case, every new session has a collision, thus read latency in the worst case is described by the formula prefetch_queue_depth/session_load_rate. Table 9 below provides latency expectations for the worst case, with units in microseconds:

TABLE 9

| Session Load Rate(Ksps) | 100.0 | 200.0 | 400.0 | 800.0 | 1600.0 |
|---|---|---|---|---|---|
| Prefetch Queue Depth(100) | 1000.0 | 500.0 | 250.0 | 125.0 | 62.5 |
| Prefetch Queue Depth(200) | 2000.0 | 1000.0 | 500.0 | 250.0 | 125.0 |
| Prefetch Queue Depth(300) | 3000.0 | 1500.0 | 750.0 | 375.0 | 187.5 |
| Prefetch Queue Depth(400) | 4000.0 | 2000.0 | 1000.0 | 500.0 | 250.0 |

Assume SPU performance is 1 Mpps, and session cache size is 0.5M, cache expire timer=0.5M/1 Mpps=0.5 seconds. Under these assumptions, when session is inactive for 0.5 second, the session cache will be invalid. If the packet rate for this session is always greater than 2 pps, then the session will always remain in the cache, under these assumptions. For real time sessions like voice and video sessions, packet rate should be >2 pps, and those sessions should therefore always stay in cache. Accordingly, it can be predicted with reasonable certainty that high speed sessions will remain in cache. Assume the total number of sessions is much larger than the cache size, and that the sum of traffic rate for low speed sessions (e.g., less than or equal to 2 pps) is Rs, then the estimated cache load rate is about Rs per second. For the assumed low speed sessions, the session cache missing rate is 100%, and high speed sessions, the session cache hit rate is 100%. These number are approximations of reasonable certainty.

The techniques of this disclosure handle the case where session cache is missing, and CPU is on hold to wait load that session into cache. The proposed prefetching mechanism handles this situation. Although initially the CPU will have to wait until session cache is loaded if the ingress queue is empty, after the initial wait, the next session cache missing is perfected before the session is processed by the CPU, as the packet is waiting in the queue for the prefetching time. Thus the session cache missing will affect overall packet processing latency, but it is not expected to affect long term overall processing performance, as long as the ingress queue is deeper enough (e.g., to hold number of packets greater than or equal to prefetch_latency*CPU_performance in_packet_per second) to overcome prefetching latency.

For short-lived sessions, such as web browsing sessions, a session is created in session cache, and if session life time is short, e.g., less than session expire time 0.5 s, the session will stay in cache until it dies.

Table 10 below lists three type disk technologies and their expected performance, capacity and latency parameters.

TABLE 10

| Storage | | | Write Performance | | Read Performance | |
|---|---|---|---|---|---|---|
| Type | Capacity | Latency | MBps | KOps | MBps | KOps |
| HD | 1 TB | 2 ms | 50 | 0.2 | 50 | 0.2 |
| Flash-SSD | 100 GB | 100 us | 100 | 3.3 | 200 | 35 |
| DRAM-SSD | 100 GB | 10 us | 600 | 1200 | 600 | 1200 |

In summary, the techniques of this disclosure may achieve about 32M~48M sessions on XLR (having 4G memory), and 128M sessions on Prism SPC (having 8G memory). Using a master SPC 36 in accordance with the techniques of this disclosure can achieve about 21M sessions on a standard XLR, and 128M sessions, using a standard Prism SPC. The techniques of this disclosure with respect to the SPU can cause the total throughput of disks to improve greatly, and improve overall system pps performance in some cases.

In addition to achieving scalability to support the number of flows that needs the multiple of memory configured in the system, the techniques of this disclosure can also help achieve energy efficiency. When the system turns off a slave SPC, the proposed solution may help migrate flow tables from this SPC to others smoothly.

The techniques described in this disclosure may be implemented, at least in part, in hardware, software, firmware or any combination thereof. For example, various aspects of the described techniques may be implemented within one or more processors, including one or more microprocessors, digital signal processors (DSPs), application specific integrated circuits (ASICs), field programmable gate arrays (FPGAs), or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry. A control unit comprising hardware may also perform one or more of the techniques of this disclosure.

Such hardware, software, and firmware may be implemented within the same device or within separate devices to support the various operations and functions described in this disclosure. In addition, any of the described units, modules or components may be implemented together or separately as discrete but interoperable logic devices. Depiction of different features as modules or units is intended to highlight different functional aspects and does not necessarily imply that such modules or units must be realized by separate hardware or software components. Rather, functionality associated with one or more modules or units may be performed by separate hardware or software components, or integrated within common or separate hardware or software components.

The techniques described in this disclosure may also be embodied or encoded in a computer-readable medium, such as a computer-readable storage medium, containing instructions. Instructions embedded or encoded in a computer-readable medium may cause a programmable processor, or other processor, to perform the method, e.g., when the instructions are executed. Computer readable storage media may include random access memory (RAM), read only memory (ROM), programmable read only memory (PROM), erasable programmable read only memory (EPROM), electronically erasable programmable read only memory (EEPROM), flash memory, a hard disk, a CD-ROM, a floppy disk, a cassette, magnetic media, optical media, or other computer-readable storage media. It should be understood that the term "computer-readable storage media" refers to physical storage media, and not signals, carrier waves, or other transient media.

Although generally described with respect to a single device that includes a master service processing card and a number of slave service processing cards, it should be understood that the techniques of this disclosure may also apply to any network appliances that deal with layer 4 to layer 7 packet processing for which state information is held. For example, the techniques of this disclosure may be applied to a single device or a system including a number of chassis.

Various examples have been described. These and other examples are within the scope of the following claims.

The invention claimed is:

1. A network device comprising:
   a plurality of network interfaces comprising a first network interface that receives a packet;
   a storage card that stores session data for network sessions monitored by the network device;
   a plurality of service processing cards that each processes packets of a respective subset of the network sessions, wherein each of the service processing cards comprises a respective memory to store session data for the respective subset of the network sessions processed by the corresponding service processing card; and
   a switch fabric coupled to the plurality of network interfaces, the storage card, and the plurality of service processing cards, such that the switch fabric interconnects the storage card with at least one of the plurality of service processing cards and interconnects any two or more of the plurality of network interfaces, the storage card, and the plurality of service processing cards with one another,
   wherein one of the plurality of service processing cards processes the received packet based on the session data stored by the storage card, and
   wherein to process the packet, the one of the plurality of service processing cards retrieves the session data for the network session to which the packet corresponds from the storage card via the switch fabric and stores the retrieved session data in the respective one of the memories.

2. The network device of claim 1, wherein one of the plurality of service processing cards comprises a master service processing cards, while the remaining ones of the plurality of service processing cards comprise slave service processing cards.

3. The network device of claim 2,
   wherein each of the slave service processing cards caches session data retrieved from the storage card to form cached session data for the network sessions being processed by the respective slave service processing card, wherein the cached session data defines a current session state for each of the network sessions being processed by the respective slave service processing card, and wherein each of the slave service processing cards exports less recently used cached session data to the storage card, and
   wherein the master service processing card stores a session hash table that describes each of the network sessions being processed by the network device and which of the plurality of service processing cards is processing each of the network sessions, without storing the current session state for each session.

4. The network device of claim 3, wherein the session hash table comprises a number of entries, each of the entries comprising a session identifier that identifies the corresponding network session and a session body identifier that identifies the one of the slave service processing cards that is processing the corresponding network session.

5. The network device of claim 2, wherein the first network interface determines whether the received packet corresponds to an existing session being processed by the network device, and, when the first network interface determines that the received packet corresponds to an existing network session, the first network interface forwards the received packet to the one of the plurality of service processing cards to which the network session has been assigned for processing.

6. The network device of claim 5, wherein the one of the plurality of service processing cards that processes the packet receives the packet that corresponds to the existing network session.

7. The network device of claim 2, wherein the first network interface determines whether the received packet corresponds to an existing session being processed by the network device and, when the first network interface determines that the received packet does not correspond to an existing network session, the first network interface forwards the received packet to the master service processing card.

8. The network device of claim 7,
   wherein the master service processing card receives the packet that does not correspond to an existing network session, identifies a network session to which the received packet corresponds and assigns the identified network session to which the received packet corresponds to one of the slave service processing cards, and
   wherein the master service processing card further updates a session hash table to indicate that the network session corresponding to the received packet is being processed by the one of the slave service processing cards and forwards the received packet to the one of the slave service processing cards to which the master service processing card assigned the identified network session.

9. The network device of claim 7, wherein the master service processing card receives the packet that does not correspond to an existing network session, assigns a network session corresponding to the received packet to one of the slave service processing cards, starts a timer, and sends the received packet to the one of the slave service processing cards to which the received packet corresponds when the master service processing card receives an acknowledgement from the one of the slave service processing cards before the timer expires.

10. The network device of claim 1, wherein to retrieve the session data for the network session to which the packet corresponds from the storage card, the one of the plurality of service processing cards executes a prefetch command to add an identifier for the session data to a prefetch queue.

11. The network device of claim 1, wherein the one the plurality of service processing cards loads session data for a plurality of network sessions through the use of a pipeline that retrieves the session data for the plurality of network sessions.

12. The network device of claim 1,
    wherein the network device comprises a router,
    wherein the router includes a service plane, a forwarding plane, a routing plane and a storage plane,
    wherein the service plane includes the plurality of service processing cards,
    wherein the forwarding plane includes the first network interface and stores data defining a forwarding table that identifies next hops for routing the packet to a destination identified by the packet,
    wherein the routing plane stores data defining a routing table that identifies a topology of a network, wherein the routing plane resolves the topology identified by the routing table to generate the data defining the forwarding table,
    wherein the storage plane includes the storage card, and
    wherein the switch fabric interconnects the storage plane, service plane, forwarding plane and routing plane to one another.

13. A method comprising:
receiving, with a network device, a packet via a first network interface of a plurality of network interfaces;
processing the received packet with one of a plurality of service processing cards of the network device that each processes packets of a respective subset of network sessions, wherein each of the service processing cards comprises a respective memory to store session data for the respective subset of the network sessions processed by the corresponding service processing card, and wherein processing the received packet comprises:
retrieving session data for the network session to which the packet corresponds from a storage card that stores session data for network sessions monitored by the network device via a switch fabric coupled to the plurality of network interfaces, the storage card, and the plurality of service processing cards, wherein the switch fabric interconnects the storage card with the one of the service processing cards and interconnects any two or more of the plurality of network interfaces, the storage card and the plurality of service processing cards with one another;
storing the retrieved session data in the memory of the one of the plurality of service processing cards; and
processing the received packet based on the session data stored by the storage card; and
outputting the processed packet.

14. The method of claim 13, wherein one of the plurality of service processing cards comprises a master service processing cards, while the remaining ones of the plurality of service processing cards comprise slave service processing cards.

15. The method of claim 14,
wherein each of the slave service processing cards caches session data retrieved from the storage card to form cached session data for the network sessions being processed by the respective slave service processing card, wherein the cached session data defines a current session state for each of the network sessions being processed by the respective slave service processing card, and wherein each of the slave service processing cards exports less recently used cached session data to the storage card, and
wherein the master service processing card stores a session hash table that describes each of the network sessions being processed by the network device and which of the plurality of service processing cards is processing each of the network sessions, without storing the current session state for each session.

16. The method of claim 15, wherein the session hash table comprises a number of entries, each of the entries comprising a session identifier that identifies the corresponding network session and a session body identifier that identifies the one of the slave service processing cards that is processing the corresponding network session.

17. The method of claim 13, further comprising:
determining, with the first network interface of the network device, whether the received packet corresponds to an existing session being processed by the network device;
when the first network interface determines that the received packet corresponds to an existing network session, forwarding the received packet to the one of the plurality of service processing cards that is processing the network session, and
when the first network interface determines that the received packet does not correspond to an existing network session, forwarding the received packet to the master service processing card.

18. The method of claim 17, further comprising, when the master service processing card receives the packet that does not correspond to an existing network session:
assigning a network session corresponding to the received packet to one of the slave service processing cards;
updating a session hash table to indicate that the network session corresponding to the received packet is being processed by the one of the slave service processing cards; and
forwarding the packet to the one of the slave service processing cards.

19. The method of claim 17, further comprising, when the master service processing card receives the packet that does not correspond to an existing network session:
assigning a network session corresponding to the received packet to one of the slave service processing cards;
starting a timer; and
sending the received packet to the one of the slave service processing cards upon receiving an acknowledgement from the one of the slave service processing cards before the timer expires.

20. A non-transitory computer-readable storage medium comprising instructions that, when executed, cause a processor of a network device to:
receive a packet via a first network interface of a plurality of network interfaces;
process the received packet with one of a plurality of service processing cards of the network device that each processes packets of a respective subset of network sessions, wherein each of the service processing cards comprises a respective memory to store session data for the respective subset of the network sessions processed by the corresponding service processing card, and wherein the instructions to process the received packet comprise instructions to:
retrieve session data for the network session to which the packet corresponds from a storage card of the network device that stores session data for network sessions monitored by the network device via a switch fabric coupled to the plurality of network interfaces, the storage card, and the plurality of service processing cards, wherein the switch fabric interconnects the storage card with the one of the service processing cards and interconnects any two or more of the plurality of network interfaces, the storage card and the plurality of service processing cards with one another;
store the retrieved session data in the memory of the one of the plurality of service processing cards; and
process the received packet based on the session data stored by the storage card; and
output the processed packet.

21. The non-transitory computer-readable storage medium of claim 20, wherein one of the plurality of service processing cards comprises a master service processing cards, while the remaining ones of the plurality of service processing cards comprise slave service processing cards.

22. The non-transitory computer-readable storage medium of claim 21,
wherein each of the slave service processing cards caches session data retrieved from the storage card to form cached session data for the network sessions being processed by the respective slave service processing card, wherein the cached session data defines a current session state for each of the network sessions being processed by the respective slave service processing card, and wherein each of the slave service processing cards exports less recently used cached session data to the storage card, and wherein the master service processing card stores a session hash table that describes each of the network sessions being processed by the network device and which of the plurality of service processing cards is processing each of the network sessions, without storing the current session state for each session.

23. The non-transitory computer-readable storage medium of claim 22, wherein the session hash table comprises a number of entries, each of the entries comprising a session identifier that identifies the corresponding network session and a session body identifier that identifies the one of the slave service processing cards that is processing the corresponding network session.

24. The non-transitory computer-readable storage medium of claim 20, further comprising instructions to:
  determine whether the received packet corresponds to an existing session being processed by the network device;
  when the received packet corresponds to an existing network session, forward the received packet to the one of the plurality of service processing cards that is processing the network session; and
  when the received packet does not correspond to an existing network session, forward the received packet to the master service processing card.

25. The non-transitory computer-readable storage medium of claim 24, further comprising instructions to, when the master service processing card receives the packet that does not correspond to an existing network session:
  assign a network session corresponding to the received packet to one of the slave service processing cards;
  update a session hash table to indicate that the network session corresponding to the received packet is being processed by the one of the slave service processing cards; and
  forward the packet to the one of the slave service processing cards.

26. The non-transitory computer-readable storage medium of claim 24, further comprising instructions to, when the master service processing card receives the packet that does not correspond to an existing network session:
  assign a network session corresponding to the received packet to one of the slave service processing cards;
  start a timer; and
  send the received packet to the one of the slave service processing cards upon receiving an acknowledgement from the one of the slave service processing cards before the timer expires.

* * * * *